US011987523B2

United States Patent
Schmiady et al.

(10) Patent No.: US 11,987,523 B2
(45) Date of Patent: *May 21, 2024

(54) HOT-FORMED, CHEMICALLY PRESTRESSABLE GLASS ARTICLES WITH A LOW PROPORTION OF CRYSTALS AND METHODS AND DEVICES FOR PRODUCING

(71) Applicant: SCHOTT AG, Mainz (DE)

(72) Inventors: Thomas Schmiady, Jena (DE); Thomas Seuthe, Jena (DE); Jörg Hessenkemper, Jena (DE); Sebastian Leukel, Mainz (DE); Susanne Krüger, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,782

(22) Filed: Nov. 30, 2023

(65) Prior Publication Data

US 2024/0092684 A1  Mar. 21, 2024

Related U.S. Application Data

(63) Continuation of application No. 16/986,196, filed on Aug. 5, 2020, now Pat. No. 11,878,939.

(30) Foreign Application Priority Data

Aug. 5, 2019  (DE) ...................... 10 2019 121 146.8

(51) Int. Cl.
*C03C 3/097* (2006.01)
*C03B 17/06* (2006.01)
(Continued)

(52) U.S. Cl.
CPC ............ *C03C 3/097* (2013.01); *C03B 17/064* (2013.01); *C03C 3/083* (2013.01); *C03C 3/085* (2013.01);
(Continued)

(58) Field of Classification Search
CPC ......... C03C 3/097; C03C 3/083; C03C 3/085; C03C 3/087; C03C 3/091; C03C 3/093; C03C 21/002; C03B 17/064
See application file for complete search history.

(56) References Cited

U.S. PATENT DOCUMENTS 3,445,214 A  5/1969  Ormesher
3,523,778 A  8/1970  Robinson
(Continued)

FOREIGN PATENT DOCUMENTS

CN  1896020  1/2007
CN  1962499  5/2007
(Continued)

OTHER PUBLICATIONS

Guedes, "Nucleation and crystal growth in commercial LAS compositions", Journal of the European Ceramic Society 21 (2001) pp. 1187-1194.
(Continued)

*Primary Examiner* — Alicia J Weydemeyer
*Assistant Examiner* — Laura B Figg
(74) *Attorney, Agent, or Firm* — Ruggiero McAllister & McMahon LLC

(57) ABSTRACT

A hot-formed, chemically prestressable glass article having a low percentage of crystals or crystallites, in particular a plate-shaped, chemically prestressable glass article, as well as to a method and a device for its production are provided. The glass article has a composition including the components $SiO_2$, $Al_2O_3$, and $Li_2O$ and a content of seed formers ($ZrO_2$, $SnO_2$, and $TiO_2$) of at least 0.8 wt %, as well as at most ten crystals, including crystallites, per kilogram of glass, which have a maximum diameter greater than 1 μm and up to at most 5 μm.

20 Claims, 8 Drawing Sheets

(51) Int. Cl.
  *C03C 3/083* (2006.01)
  *C03C 3/085* (2006.01)
  *C03C 3/087* (2006.01)
  *C03C 3/091* (2006.01)
  *C03C 3/093* (2006.01)
  *C03C 21/00* (2006.01)

(52) U.S. Cl.
  CPC .............. *C03C 3/087* (2013.01); *C03C 3/091* (2013.01); *C03C 3/093* (2013.01); *C03C 21/002* (2013.01)

(56) References Cited

U.S. PATENT DOCUMENTS

| | | | |
|---|---|---|---|
| 3,684,475 | A | 8/1972 | Bondarev |
| 4,055,703 | A | 10/1977 | Rinehart |
| 8,075,999 | B2 | 12/2011 | Barefoot |
| 8,312,739 | B2 | 11/2012 | Lee |
| 8,759,238 | B2 | 6/2014 | Chapman |
| 9,359,251 | B2 | 6/2016 | Bookbinder |
| 9,487,434 | B2 | 11/2016 | Amin |
| 9,517,968 | B2 | 12/2016 | Amin |
| 9,540,278 | B2 | 1/2017 | Chapman |
| 9,567,254 | B2 | 2/2017 | Amin |
| 9,593,042 | B2 | 3/2017 | Hu |
| 9,676,663 | B2 | 6/2017 | Amin |
| 9,701,569 | B2 | 7/2017 | Demartino |
| 9,718,727 | B2 | 8/2017 | Bookbinder |
| 9,897,574 | B2 | 2/2018 | Andrews |
| 9,902,648 | B2 | 2/2018 | Amin |
| 9,908,811 | B2 | 3/2018 | Gross |
| 9,908,812 | B2 | 3/2018 | Jain |
| 9,977,470 | B2 | 5/2018 | Demartino |
| 10,017,417 | B2 | 7/2018 | Dejneka |
| 10,180,416 | B2 | 1/2019 | Roussev |
| 10,183,887 | B2 | 1/2019 | Comte |
| 2002/0023463 | A1 | 2/2002 | Siebers |
| 2005/0090377 | A1* | 4/2005 | Shelestak ................. C03C 3/11 501/69 |
| 2005/0250639 | A1 | 11/2005 | Siebers |
| 2007/0015653 | A1 | 1/2007 | Lautenschlaeger |
| 2007/0101765 | A1 | 5/2007 | Loeffelbein |
| 2007/0101766 | A1 | 5/2007 | Loffelbein |
| 2008/0020919 | A1 | 1/2008 | Murata |
| 2010/0028607 | A1 | 2/2010 | Lee |
| 2010/0035038 | A1 | 2/2010 | Barefoot |
| 2011/0294648 | A1 | 12/2011 | Chapman |
| 2012/0052271 | A1 | 3/2012 | Gomez |
| 2012/0135852 | A1 | 5/2012 | Ellison |
| 2012/0321898 | A1 | 12/2012 | Meinhardt |
| 2013/0011542 | A1 | 1/2013 | Skalski |
| 2013/0122284 | A1 | 5/2013 | Gross |
| 2013/0186140 | A1 | 7/2013 | Brix |
| 2013/0189486 | A1 | 7/2013 | Wang |
| 2013/0224492 | A1 | 8/2013 | Bookbinder |
| 2014/0308525 | A1 | 10/2014 | Hochrein |
| 2014/0308526 | A1 | 10/2014 | Chapman |
| 2014/0345325 | A1 | 11/2014 | Allan |
| 2015/0030840 | A1 | 1/2015 | Gomez |
| 2015/0079400 | A1 | 3/2015 | Fu |
| 2015/0099124 | A1 | 4/2015 | Beunet |
| 2015/0118497 | A1 | 4/2015 | Dejneka |
| 2015/0140325 | A1 | 5/2015 | Gross |
| 2015/0147575 | A1 | 5/2015 | Dejneka |
| 2015/0239775 | A1 | 8/2015 | Amin |
| 2015/0239776 | A1 | 8/2015 | Amin |
| 2015/0259244 | A1 | 9/2015 | Amin |
| 2015/0368148 | A1 | 12/2015 | Duffy |
| 2015/0368153 | A1 | 12/2015 | Pesansky |
| 2015/0376050 | A1 | 12/2015 | Nakamura |
| 2016/0023994 | A1 | 1/2016 | Tateno |
| 2016/0102011 | A1 | 4/2016 | Hu |
| 2016/0102014 | A1 | 4/2016 | Hu |
| 2016/0122239 | A1 | 5/2016 | Amin |
| 2016/0122240 | A1 | 5/2016 | Oram |
| 2016/0257605 | A1 | 9/2016 | Amin |
| 2016/0264452 | A1 | 9/2016 | Amin |
| 2016/0338152 | A1 | 11/2016 | Lestringant |
| 2016/0347655 | A1 | 12/2016 | Meinhardt |
| 2016/0356760 | A1 | 12/2016 | Roussev |
| 2017/0022093 | A1 | 1/2017 | Demartino |
| 2017/0036952 | A1 | 2/2017 | Amin |
| 2017/0129803 | A1 | 5/2017 | Amin |
| 2017/0166478 | A1 | 6/2017 | Gross |
| 2017/0197869 | A1 | 7/2017 | Beall |
| 2017/0291849 | A1 | 10/2017 | Dejneka |
| 2017/0295657 | A1 | 10/2017 | Gross |
| 2017/0300088 | A1 | 10/2017 | Demartino |
| 2018/0002223 | A1 | 1/2018 | Hu |
| 2018/0022638 | A1 | 1/2018 | Comte |
| 2018/0029932 | A1 | 2/2018 | Hu |
| 2018/0057401 | A1 | 3/2018 | Hu |
| 2018/0127302 | A1 | 5/2018 | Gross |
| 2018/0230044 | A1 | 8/2018 | Ozeki |
| 2018/0319706 | A1 | 11/2018 | Murayama |
| 2018/0327305 | A1 | 11/2018 | Amin |
| 2019/0016632 | A1 | 1/2019 | Hu |
| 2019/0127265 | A1 | 5/2019 | Dejneka |
| 2019/0152838 | A1 | 5/2019 | Gross |
| 2019/0308394 | A1 | 10/2019 | Vogl |
| 2019/0308900 | A1 | 10/2019 | Vogl |
| 2020/0109083 | A1 | 4/2020 | Imakita |
| 2020/0262746 | A1 | 8/2020 | He |

FOREIGN PATENT DOCUMENTS

| | | |
|---|---|---|
| CN | 101454252 | 6/2009 |
| CN | 101508523 | 8/2009 |
| CN | 201923942 | 8/2011 |
| CN | 102690059 | 9/2012 |
| CN | 102815860 | 12/2012 |
| CN | 102892723 | 1/2013 |
| CN | 104098269 | 10/2014 |
| CN | 105008293 | 10/2015 |
| CN | 107663032 | 2/2018 |
| CN | 108473369 | 8/2018 |
| CN | 108863050 | 11/2018 |
| DE | 1596590 | 7/1970 |
| DE | 2218274 | 11/1972 |
| DE | 2218275 | 11/1972 |
| DE | 10017701 | 10/2001 |
| DE | 102005053641 | 6/2007 |
| DE | 102006051637 | 5/2008 |
| DE | 102010009584 | 9/2011 |
| DE | 102013203624 | 9/2014 |
| DE | 202014010479 | 10/2015 |
| DE | 102016211065 | 12/2017 |
| DE | 102017124625 | 6/2018 |
| EP | 0850888 | 7/1998 |
| EP | 1593658 | 11/2005 |
| EP | 1682458 | 1/2013 |
| GB | 1129079 | 10/1968 |
| GB | 1158958 | 7/1969 |
| GB | 1381625 | 1/1975 |
| JP | S5234643 | 3/1977 |
| JP | H06227830 | 8/1994 |
| JP | 2004099370 | 4/2004 |
| JP | 2010180076 | 8/2010 |
| JP | 2011157250 | 8/2011 |
| JP | 2016028986 | 3/2016 |
| JP | 2016113341 | 6/2016 |
| JP | 2016183070 | 10/2016 |
| WO | 2005073138 | 8/2005 |
| WO | 2011103798 | 9/2011 |
| WO | 2012126394 | 9/2012 |
| WO | 2013171047 | 11/2013 |
| WO | 2017049028 | 3/2017 |
| WO | 2017087742 | 5/2017 |
| WO | 2019004124 | 1/2019 |

(56) References Cited

FOREIGN PATENT DOCUMENTS

| WO | 2019054342 | 3/2019 |
|----|------------|--------|
| WO | 2019085422 | 5/2019 |

OTHER PUBLICATIONS

Venkateswaran, "Crystallisation studies on site saturated lithium aluminosilicate (LAS) glass", Thermochimica Acta, 679 (2019) 178311, 9 pages.

Ovono, "Study of the crystallization kinetics of LAS glass by differential scanning calorimetry, X-ray diffraction, and beam bending viscometry", Thermochimica Acta 527, (2012), pp. 158-164.

English translation of International Search Report dated Oct. 26, 2020 for PCT/EP2020/071965, 2 pages.

English translation of Written Opinion of the International Searching Authority dated Oct. 26, 2020 for PCT/EP2020/071965, 7 pages.

English translation of International Preliminary Report on Patentability dated Feb. 17, 2022 for PCT/EP2020/071965, 9 pages.

DIN EN ISO 14577-1, "Metallic materials—Instrumented indentation test for hardness and materials parameters—Part 1: Test method (ISO 14577-1:2015)", Nov. 2015, 53 pages.

DIN EN ISO 6507-2, "Metallic materials—Vickers hardness test—Part 2: Verification and calibration of testing machines (ISO 65072: 2018)", Jul. 2018, 28 Pages.

English Translation of DIN ISO 6344-2, "Coated abrasives—Grain size analysis Part 2: Determination of grain size distribution of macrogrits P12 to P220 (ISO 6344-2 : 1998)", Apr. 2000, 11 pages.

ISO 4545-1, "Metallic materials—Knoop hardness test—Part 1: Test method", Second Edition, Dec. 2012, 32 pages.

\* cited by examiner

HOT-FORMED, CHEMICALLY PRESTRESSABLE GLASS ARTICLES WITH A LOW PROPORTION OF CRYSTALS AND METHODS AND DEVICES FOR PRODUCING

CROSS REFERENCE TO RELATED APPLICATIONS

This application is a continuation of U.S. patent application Ser. No. 16/986,196, filed Aug. 5, 2020, which claims benefit under 35 USC § 119 of German Application No. 10 2019 121 146.8 filed Aug. 5, 2019, the entire contents of all of which are incorporated herein by reference.

BACKGROUND

1. Field of the Invention

The invention relates to a hot-formed chemically prestressable glass article with a low proportion of crystals, in particular a hot-formed chemically prestressable plate-shaped or disc-shaped glass article, as well as to a methods and devices for its production.

A glass that is chemically prestressable is understood in the context of the present disclosure to mean a glass that is amenable to an ion exchange process. In such a process, ions of alkali metals are exchanged in a surface layer of a glass article, such as, for example, a glass plate or disc. This occurs in such a way that henceforth a zone of compressive stress is built up in the surface layer, this being brought about by the exchange of ions having small radii by ions having larger radii. For this purpose, the glass article is immersed in a so-called ion exchange bath, for example, a salt melt, where the ion exchange bath comprises the ions having the larger ionic radii, in particular potassium ions and/or sodium ions, so that these ions migrate into the surface layer of the glass article. In exchange for them, ions having smaller ionic radii, in particular lithium ions and/or sodium ions, migrate out of the surface layer of the glass article into the ion exchange bath. In this way, a zone of compressive stress is formed within the glass article near its surface.

2. Description of Related Art

Chemically prestressable glasses and/or chemically prestressable or chemically prestressed glass articles and/or methods for the production of such articles are known.

Chemically prestressable glasses can thereby be differentiated into so-called aluminum silicate glasses (also referred to as AS glasses, alumosilicate glasses, or aluminosilicate glasses), which comprise as components, in particular, $Al_2O_3$ and $SiO_2$ as well as alkali oxides, except for lithium oxide $Li_2O$, as well as lithium aluminum silicate glasses (also referred to as LAS glasses, lithium alumosilicate glasses, or lithium aluminosilicate glasses), which, furthermore, additionally comprise $Li_2O$ as a component.

In hot forming, in particular the hot forming of chemically prestressable glass articles that are composed of the previously discussed glasses, in particular in the hot forming of plate-shaped chemically prestressable glass articles, down-draw or overflow fusion methods can be applied, although, preferably, float methods are utilized.

In conventional float methods, for example, molten glass is allowed to flow continuously over a pouring lip, which is also referred to as a spout or a spout lip, onto the molten metal of the float bath.

At the point at which the molten glass impinges on the float bath, what is frequently referred to as an "onion" or "heel" is formed. In each case, the predominant part of the molten glass flows forward in the direction toward the exit of the float bath, although a part thereof also flows opposite to the direction in which the glass is stretched by drawing and hence backward and from there laterally. This part of the float bath, in which the glass flows backward, is also referred to as the wetback region. The wetback region of the float glass is regularly formed in a nearly funnel shape and opens in the direction toward the exit of the float bath. The two shanks of this funnel generally are composed of tiles made of refractory ceramics, which are also referred to as restrictor tiles.

The narrow side of this funnel forms the front wall of the float tank of the float bath or a tile made of refractory ceramics in front of it, which is also referred to as a wetback tile.

The part of the glass flow flowing backward impinges against the wetback and restrictor tiles, is diverted by them, and flows, together with the main bulk of the glass, in the direction toward the exit of the float tank.

It has already been recognized that a backup of glass occurring in the wetback region can lead to flaws in the glass. In the glass backup, the glass has a longer residence time on the float bath than does the glass that flows directly toward the exit. The longer residence time can lead to a differing viscosity, because the glass cools more intensely; however, crystallization phenomena and hence devitrification phenomena or decomposition phenomena can also occur.

The edge strips of the glass ribbon in the wetback region have already been heated by passing electric current through them (for example, DE-PS 1 596 590) in order to once again lower the viscosity in this area.

Another approach is described in DE-A-2 218 275, in which the flow rate of the molten glass in the wetback region is intended to be improved by means of a special shaping of the entire guide body. Furthermore, in accordance with this specification, it is possible, in the wetback region between the glass and the shaped tile, to provide a gas cushion for support of the glass. In doing so, however, gas can also enter under the glass and lead to both impairments in the glass ribbon and undesired turbulences in the float bath.

If the previously mentioned method using crystallizable types of glass is carried out, crystallized or devitrified portions of the floated glass are obtained as a rule and the use of glass that has been floated in this way is no longer capable of being used for display applications, for example. The crystallized portions have a markedly higher viscosity and, as a result, can "get caught up" especially at the restrictor tiles, as a result of which an additional glass backup can be created and can act unfavorably in the subsequent hot forming.

Components or parts of the wetback and restrictor tiles can act as heterogeneous seeds, which, in consequence of the long residence time in the wetback region, can lead to an interfering crystal formation, in particular in the border.

This technical problem has hitherto been addressed in two ways. On the one hand, types of glass that are less susceptible to the formation of these flawed sites have been developed and, on the other hand, the undesired crystallization or seed formation has been counteracted by way of the specific creation of a flow in the bath metal.

In accordance with U.S. Pat. No. 3,684,475, a circulation pump is used to create a laminar flow of the bath metal corresponding to the speed of the glass ribbon on the metal bath, by way of which a non-uniform speed of the bath metal in the edge region and, in association therewith, a non-uniform crystallization, in particular in the edge region, should be prevented.

In accordance with WO 2005/0 731 38 A1, a flow of bath metal is likewise introduced in the wetback region and is intended to prevent the spread of the "onion" backward to such an extent that the glass can no longer form any fixed point at the wetback tile. Owing to the absence of a fixed point, however, it is difficult to keep the position of the glass ribbon stable and a defined shaping of the glass ribbon is made difficult. Furthermore, as a result of this, it is also prevented that contaminants originating from the spout, which is also referred to as a lip tile or a spout lip, are carried from the spout into the border region owing to the flow relationships and hence cannot enter the product.

A similar method is known from EP 0 850 888 A1. In this case, a vertical flow is created in the float bath in the region of the edges of the glass ribbon, by means of which the position of the edge of the glass ribbon on the float bath is intended to be controlled.

GB 1,158,958 A describes a method in which the restrictor tiles are composed of a gas-permeable material from which compressed gas is blown against the glass in order to minimize the friction at the restrictor tiles. A particular drawback of this method is the circumstance that gas can enter beneath the glass surface and thereby counteract the production of a high-quality glass ribbon.

The German patent DE 10 2005 053 641 B3 teaches the creation of a film composed of float bath metal between the wetback tile and/or the restrictor tiles and the glass flow in the region of the pouring zone, this film preventing the direct contact between the molten glass and the wetback tile and/or the restrictor tiles.

However, the previously discussed measures are often inadequate in order to float glasses, in particular prestressable glasses, that exhibit a strong crystallization tendency, without thereby bringing about an undesirably high crystallization and thus an undesirably large formation of crystals or crystallites within the floated glass.

SUMMARY

In accordance with the present invention, a method and a device also for glasses that are chemically prestressable and thus for producing chemically prestressable, hot-formed plate-shaped glass articles are to be presented, by means of which these glasses and glass articles can be hot-formed and, in particular, floated, without an undesirably large number of crystals thereby being formed in a predefined volume of the hot-formed, chemically prestressable glass article.

Disclosed in accordance with the invention is a chemically prestressable, hot-formed, plate-shaped glass article with a composition comprising: the components $SiO_2$, $Al_2O_3$, and $Li_2O$, a content of $ZrO_2$, $SnO_2$, and $TiO_2$ in sum total of at least 0.8 wt %, as well as preferably at most ten crystals, including crystallites, per kilogram of glass, which have a maximum diameter greater than 1 µm and up to at most 5 µm, preferably up to at most 2 µm.

The content of $ZrO_2$, $SnO_2$, and $TiO_2$ is in sum total preferably less than 6 wt %, especially preferred less than or equal to 4.5 wt %, and most especially preferred less than or equal to 3 wt %.

The maximum diameter can be determined, for example, by way of electron micrographs or light micrographs.

Preferably, for crystals, including crystallites, electron microscope measurement is used for a range of size of the maximum diameter of the crystals, including the crystallites, of 1 µm to 4 µm and light microscope measurements are used for a maximum diameter of 2 µm to greater than 5 µm.

In a light microscope determination, it may thereby be helpful when, prior to the light microscope measurement, lateral light is coupled into the plate-shaped glass article and the crystals that are to be measured, including the crystallites, are illuminated in this way and can be marked prior to light microscope measurement.

In this kind of measurement, it should deliberately be taken into account that, during the measurement, three-dimensionally structured crystals or crystallites can also extend with their maximum lengthwise extension in the direction of the optical axis of the electron microscope or light microscope and, in this case, a smaller measured value of the maximum crystal diameter than the actual lengthwise extension existing in the lengthwise direction of the crystal or crystallite is then obtained.

However, because the optical axis of the light microscope or electron microscope should extend perpendicular to one of the two main surfaces of the plate-shaped glass article in these measurements, the maximum diameter that is then measured also corresponds especially to the diameter that is of central importance for the scatter or deflection of light that passes through the plate-shaped glass article perpendicular to these main surfaces.

Regarded as the maximum diameter is thereby the largest measured diameter in one direction that extends in the plane of the main surface of the plate-shaped glass article and from which the measurement is made. In the case of light microscope measurement, it is possible in each case to focus on the largest diameter of the crystal and thereby to obtain a good estimate of the size.

The light microscope measurement can further also comprise phase contrast methods of measurement.

For the purpose of these measurements, it seems to be adequate when the respective measuring accuracy and thus the respective resolution of the light microscope or electron microscope in a direction parallel to the main surface of the plate-shaped glass article has a value of +/−0.1 to 0.5 µm.

As a lower limit of the crystal sizes referred to above, a limit of 1 µm is given. Accordingly, the present disclosure, at least insofar as crystal or crystallite portions are presented, relates in each case to crystal sizes with a maximum diameter greater than 1 µm and at most 5 µm, preferably at most 2 µm.

In the context of the present disclosure, the term crystal here is also to include crystallites; this means that, in each instance, the term also includes particulate crystalline structures for which it is not possible to draw a conclusion from the shape itself as to the kind of crystal, but which is present as a particulate structure, which is also referred to as a grain.

The statement "at most ten crystals per kilogram of glass, which have a maximum diameter of 1 µm up to at most 5 µm, preferably up to at most 2 µm" is intended thereby to include all crystals, including crystallites, within the glasses or glass articles disclosed here; this means that these glasses or glass articles may have additional crystals, insofar as they are smaller than 1 µm, but they should not have any crystals whose maximum diameter is greater than 5 µm and should preferably have no crystals whose maximum diameter is greater than 2 µm.

In a preferred embodiment, the chemically prestressable glass and thus also the chemically prestressable, in particular plate-shaped glass article has a temperature with a maximum crystal growth rate Kgmax (given in ° C.) from 925° C. to 1100° C., preferably 950° C. to 1050° C., and a maximum crystal growth rate of 2 μm/min to 16 μm/min, preferably from 4 μm/min to 8 μm/min, in particular from 5.9 μm/min to 6.4 μm/min, at this temperature Kgmax.

In accordance with one embodiment of the chemically prestressed or chemically prestressable, plate-shaped glass article, it comprises a glass comprising the following components in wt %: $SiO_2$ 57 to 69, preferably 59 to 69, especially preferred 61 to 69, where the upper limit in each case can be preferably 67, $Al_2O_3$ 17 to 25, preferably 17 to 24, especially preferred 17 to 21, $B_2O_3$ 0 to 7, preferably 0 to 5, especially preferred 0 to 4.5, $Li_2O$ 3 to 5.5, preferably 3.5 to 5.5, especially preferred 3.5 to 5, $Na_2O$ 0.3 to 7, preferably 0.3 to 6, especially preferred 0.8 to 5.5, or even most preferably from 0.8 to 4.5, where preferably the sum of the content of $Al_2O_3$ and $SiO_2$, in relation to the given value in wt %, lies between at least 75 and at most 92, preferably at most 90.

As a glass constituent, $SiO_2$ is a so-called network former. A high percentage of $SiO_2$ in a glass increases the chemical resistance of the glass, in particular the resistance to acids, and is therefore advantageous. It is also known that quartz glass $SiO_2$ forms a very rigid, three-dimensionally cross-linked glass network. In accordance with one embodiment of the glass or of the glass article containing the otherwise additional presently disclosed composition constituents, therefore, the content of $SiO_2$ is at least 57 wt %, preferably in fact at least 59 wt % $SiO_2$, and especially preferred at least 61 wt % $SiO_2$. However, too high a content of $SiO_2$ results in the glass being fusible only with difficulty.

For this reason, in accordance with the presently disclosed embodiments, the content of $SiO_2$ in the glass is limited and is at most 69 wt %, preferably at most 67 wt %.

In accordance with one embodiment, the total content of alkali oxides in the glass and/or in the glass article with the otherwise additional presently disclosed composition constituents is preferably at least 4 wt % and at most 12 wt %, preferably at most 10 wt %.

In accordance with one embodiment with the otherwise additional presently disclosed composition constituents, the sum total of the content of $SiO_2$ and $Al_2O_3$ is not greater than 92 wt %, preferably not greater than 90 wt %. Especially preferred, the total content of network formers in the glass and/or in the glass article is at most 92 wt %, most especially preferred at most 90 wt %. This is advantageous, because, in this way, a glass that is still fusible and consequently can be produced in an economical manner is obtained.

In accordance with another embodiment of the glass article or of the glass, the content of $Li_2O$ in the glass or in the glass article with the otherwise additional presently disclosed composition constituents is preferably at least 3 wt %, especially preferred at least 3.5 wt %, and at most 5.5 wt %, preferably at most 5.0 wt %. This is advantageous, because, in the case of higher contents of $Li_2O$ in the glass or in the glass article, an increased crystallization or an enhanced demixing can occur.

In accordance with another embodiment, the glass comprises at most 6 wt %, preferably at most 5.5 wt % $Na_2O$, especially preferred in fact only at most 4.5 wt % $Na_2O$.

A low content of the alkali oxide $Na_2O$ is particularly advantageous in regard to the resistance to acids.

In accordance with one embodiment of the glass article, the glass comprises the additional composition constituents given in the context of the present disclosure, but at least 57 wt % $SiO_2$, preferably at least 59 wt % $SiO_2$, especially preferred at least 61 wt % $SiO_2$, and/or the glass comprises at most 69 wt % $SiO_2$, preferably at most 67 wt % $SiO_2$.

A further optional component of the glass or of the glass article is $B_2O_3$. A certain content of $B_2O_3$ in the glass can be advantageous, because this lowers the melting point of the glass and therefore improves the fusibility. The component $B_2O_3$ also increases the scratch resistance of a glass. Surprisingly, however, it has been found that too high a content of $B_2O_3$ in the glass or in the glass article diminishes the prestressability. In accordance with one embodiment with the otherwise presently disclosed additional composition constituents, the content of $B_2O_3$ in the glass and/or in the glass article is therefore at most 7 wt %, preferably at most 5 wt %, and especially preferred at most 4.5 wt %.

EXAMPLES

An exemplary composition range of a glass is given for a first exemplary embodiment by the following composition in wt %: $SiO_2$ 57 to 69, preferably 59 to 69, especially preferred 61 to 69, where the upper limit in each case can be preferably 67, $Al_2O_3$ 17 to 25, preferably 17 to 24, especially preferred 17 to 21, $B_2O_3$ 0 to 7, preferably 0 to 5, especially preferred 0 to 4.5, $Li_2O$ 3 to 5.5, preferably 3.5 to 5.5, especially preferred 3.5 to 5, $Na_2O$ 0.3 to 7, preferably 0.3 to 6, especially preferred 0.8 to 5.5, most especially preferred 0.8 to 4.5, $K_2O$ 0 to 1, preferably 0 to 0.8, especially preferred 0 to 0.7, MgO 0 to 2, preferably 0 to 1.5, especially preferred 0 to 1, CaO 0 to 4.5, SrO 0 to 2, preferably 0 to 1.5, especially preferred 0 to 1, ZnO 0 to 3, preferably 0 to 2, especially preferred 0 to 1.5, $P_2O_5$ 0 to 3, preferably 0 to 2, especially preferred 0 to 1.7, $ZrO_2$ 0 to 3, preferably 0 to 2.8, especially preferred 0-2.5, most especially preferred 0-1, $TiO_2$ 0 to 3, preferably 0 to 2.8, especially preferred 0-2.5, most especially preferred 0-1, $SnO_2$ 0 to 2, preferably 0 to 1.5, especially preferred 0-1, most especially preferred 0-0.8, where, furthermore, contaminants and/or refining agents and/or coloring constituents can be present in amounts up to 2 wt % and where the previously mentioned $SnO_2$ is a refining agent in the sense of the refining agent additionally present.

The thickness of the glass article, which, in particular, is plate-shaped glass, can be at least 0.4 mm and at most 3 mm.

In general, however, the thickness of the glass article is advantageously at least 0.5 mm.

In the preferred embodiments, however, the thickness of the glass article is at most 2 mm, preferably at most 1 mm.

In the method for the production of a chemically prestressable, hot-formed, plate-shaped glass article, in particular of a crystallizable chemically prestressable, hot-formed, plate-shaped glass article, the hot forming is conducted by means of a float method or down-draw or overflow fusion method, preferably by means of a float method.

In the method for the production of a chemically prestressable, hot-formed, plate-shaped glass article, in particular of a crystallizable chemically prestressable, hot-formed, plate-shaped glass article, comprising the components $SiO_2$. $Al_2O_3$, and $Li_2O$ and comprising preferably at most ten crystals, including crystallites, per kilogram of glass, which have a maximum diameter of greater than 1 μm up to at most 5 μm, preferably of at most 2 μm, the hot forming is preferably conducted by means of a float method.

In a preferred embodiment of the method, which preferably comprises a float method, through heating of the lip tile or spout area (wetback) by means of heating units that are preferably placed beneath the lip tile and are also referred to as underlip heaters, in particular in that a partial flow of gas, which flows counter to the direction of drawing and preferably comes into contact with the restrictor tiles, the glass temperature is kept above the upper devitrification temperature OEG of the glass that is to be hot-formed.

In this method, the viscosity of the glass is preferably kept at less than $\lg(\eta/dPas)=3.5$ in the shear region at the restrictor tiles and thus at the edge tiles of the float tank of the float bath in the wetback or backflow region, in particular in the region in which the glass 8 that is to be hot-formed comes into contact with the restrictor tiles. The wetback or backflow region here refers to the region of the float tank or of the float bath within which the portions of the glass that is to be hot-formed has speed components that are opposite in direction to the direction of drawing Y, which will be discussed in more detail below.

The seed formation is reduced or even prevented by an increased flow rate when, for example, the flow rate is increased, in particular, at the edge tiles of the float tank of the float bath in the wetback or backflow region, which are also referred to as restrictor tiles, or preferably at the extension tiles by constriction preferably transverse to the drawing direction Y in comparison to when the method is carried out without extension tiles. Preferably, the extension tiles, which are also referred to as extension edge tiles, are composed of graphite or comprise graphite in this case.

The backflow region or wetback region is understood here to mean the region of the float bath within which the flowing glass that is to be hot-formed has a speed component that is opposite in direction to the drawing direction Y.

Preferably, the entry of seeds by way of condensates of vaporized tin or glass constituents can be reduced by an exchange of atmosphere at a distance of 0 m to 3 m behind the spout or lip tile, in particular in bay 1, to >50/h (nominal volume) in comparison to an operation without an exchange of atmosphere.

The gas throughput through bay 1 corresponds to the removal of float bath atmosphere through the vent-outs located in bay 1 or by means of exhaust fluid pumps 59, in particular Venturi pumps, distributed throughout the volume of the bay 1 float bath section. At the high temperatures in bay 1, the float bath atmosphere expands strongly relative to the nominal volume (at 25° C.).

The nitrogen and the forming gas, which are fed in parallel to it, are supplied without lances at different points of the float bath furnace 9' (nearly in a bay-by-bay manner) in the roof casing and, accordingly, above the float bath 7' and the molten glass 8 that is to be hot-formed, and fed into the float bath furnace 9' and cool the connections of the electric heaters 10 that are located there. The gases then enter the float bath through the separating joints of the refractory roof elements of the float bath furnace 9'.

When, in the presently disclosed method, the knurl or top roller surface material is made of stainless steel or comprises stainless steel, it is possible therewith to minimize or even to suppress the adhesion to and the seed formation at this surface.

It is advantageous when the surface temperature of the knurl or top roller can be adjusted, in particular, so that the seed formation in the border region is reduced. The previously mentioned knurl surface material is the surface material of a top roller that enters into contact with the glass that is to be hot-formed.

Additionally or alternatively to the previously mentioned measures, adhesions at the knurls, such as, for example, condensates or glass cakings, are regularly removed. Depending on the hot forming as well as on the glass of the glass article, this process can be conducted weekly, daily, or even hourly, for example.

Advantageously maintained is an overall cooling gradient of the glass in the shaping region of the float bath, within which the viscosity of the glass that is to be hot-formed is $\lg(\eta/dPas)=4$ to 7.6, of at least 25 K/m to preferably at most 35 K/m and/or a cooling rate of the glass in this shaping region of 28 K/min+/−5 K/min, for a thickness D of the hot-formed glass article 13 of 0.4 mm to 3 mm.

One embodiment of a device for the production of a chemically prestressable, hot-formed, plate-shaped glass article comprises a heating unit, which is arranged in the area of the lip tile or spout, preferably directly adjoining the lip tile or spout and preferably beneath the lip tile or spout.

Preferably, the device for the production of a chemically prestressable, hot-formed, plate-shaped glass article comprises extension tiles that contain graphite or are composed of graphite. In this way, it is possible to minimize further or even to suppress the entry of seed-forming portions out of the material of the float tank.

By use of top rollers that can be adjusted in terms of their temperature, in particular the temperature of the roller surface with which the glass that is to be hot-formed comes into contact, it is possible in the presently disclosed device to influence positively any further crystal formation, in particular in the region of the border of the glass ribbon.

When, in this device, the top roller, in terms of its surface that comes into contact with the glass that is to be hot-formed, is designed in a structured manner, in particular in a knurled or toothed manner, it is thereby possible, in spite of a good mechanical contact, to further reduce any adhesions.

In this case, it can be advantageous when its surface that is in contact with the glass that is to be hot-formed is covered with stainless steel or is composed of stainless steel.

Possible uses of the hot-formed glass article are, for example, as a cover plate, in particular as a cover glass in particular as a cover panel for devices in consumer electronics, in particular for display devices, monitors for computing devices, measurement devices, TV-devices, in particular as cover panel for mobile devices, in particular for at least one device of the group comprising: mobile terminals, mobile data processing devices, such as mobile phones, mobile computers, palm tops, laptops, tablet computers, wearables, portable watches and time measuring devices, or as a protective glazing, in particular as a protective glazing for machines, or in a glazing in high-speed trains or in safety glass or in automobile windows or, for example, in timepieces, such as diver's watches, or in submarines or else as a cover plate for explosion-proof devices, in particular for those in which the use of glass is compulsory.

The invention will be explained below in detail on the basis of the appended drawings and with reference to preferred and especially preferred exemplary embodiments.

BRIEF DESCRIPTION OF THE DRAWINGS

FIG. 6 is an exemplary illustration of the rate of crystallization at certain temperatures of a presently disclosed, chemically prestressable glass that is to be hot-formed and that the plate-shaped glass article comprises or of which the plate-shaped glass article can be composed of;

DETAILED DESCRIPTION

Figure 1:
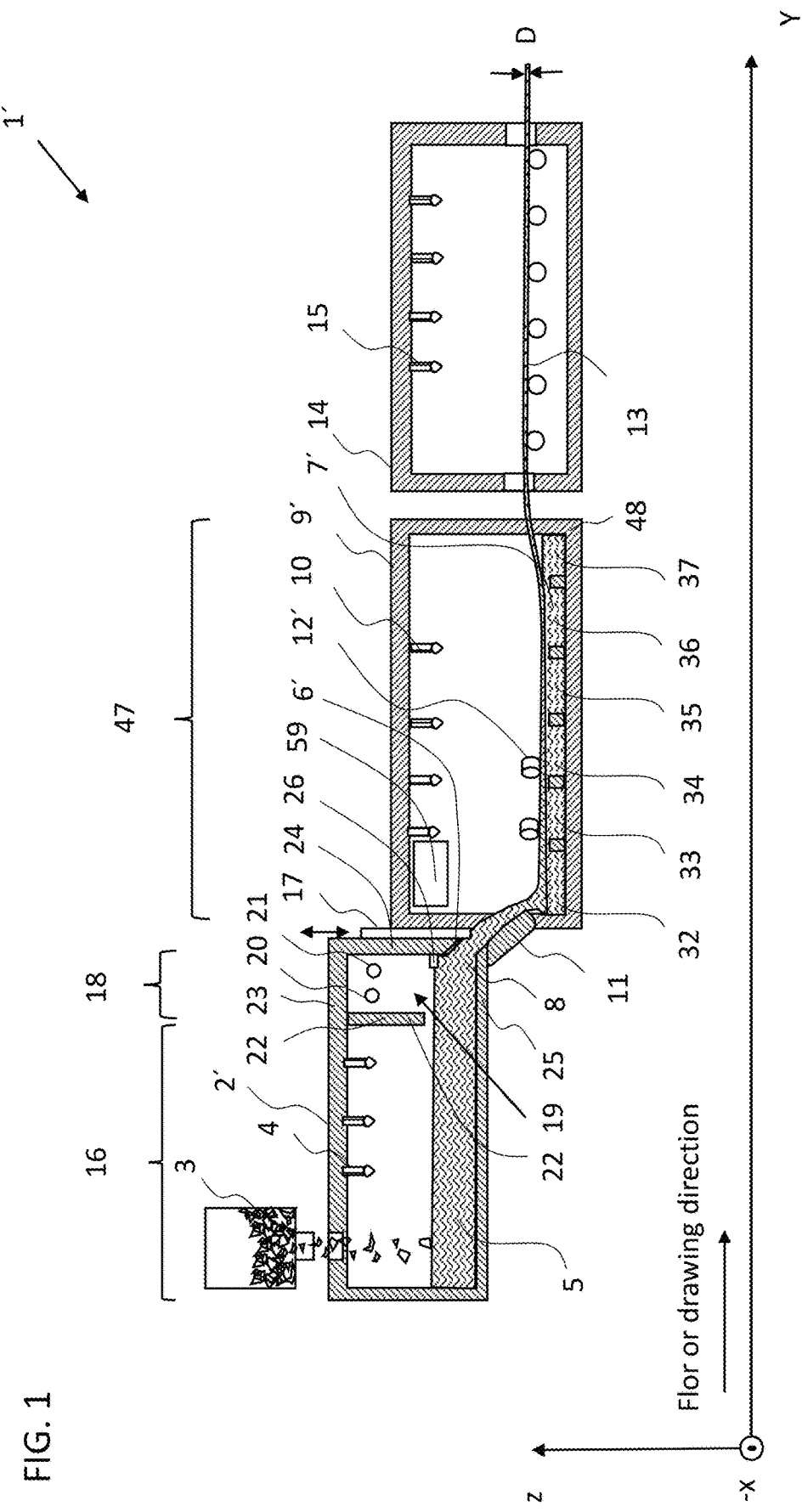
FIG. 1 is a schematic sectional view of a device for the production of a hot-formed glass article of a preferred embodiment of the invention, in which the sectional plane extends vertically roughly through the middle of the device.

In the following description of preferred and especially preferred embodiments, the same reference characters in the various figures refer to identical or identically acting component parts of the device that is disclosed in each case.

First of all, reference is made to the conventional facility illustrated in FIG. 2 for the production of floated glass, which, in its entirety, as also shown below for the device according to the invention, bears the reference number 1.

This float facility 1 has a melting furnace 2. which is also referred to as a melting tank and into which is fed, in a known way, a glass batch 3 that is to be melted and that is heated by means of burners 4 until a glass melt 5 of the desired composition is formed. Further devices for the homogenization of the glass melt are known to the person skilled in the art and consequently will not be described in detail.

By way of a channel 6, as a rule under the influence of the force of gravity, the molten glass of the glass melt 5 reaches a float bath 7, which contains liquid tin and on which the glass 8 that is to be hot-formed can spread out, under the influence of the force of gravity, as part of its hot forming with a reduction in its height.

The liquid tin is contained as a float bath 7 in a float tank 48, in which its temperature and viscosity can each be adjusted in a defined and targeted manner within the float bath sections 32 to 37, which are described below in more detail and are referred to as a bay.

For adjustment of the temperature of the glass that is to be hot-formed, the tin bath 7 can be arranged in a float bath furnace 9, which likewise has electrical heaters 10, by means of which the temperature of the glass that is to be hot-formed can be adjusted.

On exiting the melting tank 2, the molten glass 8 that is to be hot-formed is conveyed onto the tin bath 7, on which it already begins to spread out, via a pouring lip 11, which extends diagonally downward and is also referred to as a lip tile or spout. By the use of roller-shaped top rollers 12 as a drawing device, the glass ribbon 13 that is formed on the tin bath 7 is influenced in a defined manner in terms of its further movement in its spreading movement from the side. In FIGS. 1 and 2, only two top rollers are illustrated in each case by way of example, although, depending on need, it is also possible to have present and to use more than two of these top rollers.

After its hot forming, the glass ribbon 13 can be conveyed, if need be, into a lehr oven 14, which likewise can have electrical heaters 15 in order to subject the glass ribbon to a defined temperature decrease.

After exiting the lehr oven 14, the glass ribbon 13 is then available for further processing, in particular for division into glass plates or into glass substrates.

In order to be able to illustrate more clearly, in the following description of embodiments in accordance with the invention, the spatial arrangements of different structural groups or the properties of, for example, glasses, glass articles, or, in particular, plate-shaped glass articles that are to be hot-formed, reference is made, first of all, to the Cartesian coordinate system depicted in FIG. 3, which defines an X direction, Y direction, and Z direction orthogonal to one another, to which all statements that follow in regard to the various figures refer.

The X direction and Y direction span a plane that extends horizontally and thus also essentially parallel to the surface of the tin bath 7. Extending perpendicular to this plane, the Z direction extends upward and thereby also defines the direction of the normal line with respect to the glass ribbon 13.

In the following, reference is made to FIG. 1, which comprises, as a device for the production of a hot-formed glass article, in particular of a hot-formed, plate-shaped glass article, the float facility that is furnished in its entirety with the reference sign 1" and which has all of the devices that are described with reference to FIG. 2.

A device for melting 16 here comprises the melting tank or the melting furnace 2", a conveying device for the glass batch 3, and the burners 4. Furthermore, the melting tank 2" has a channel 6" for conveying the molten glass 8 that is to be hot-formed onto the tin bath 7".

By way of example, the control gate 17 and thus the structural part for regulating the throughput of the glass flow, which is also referred as a tweel, is arranged behind the channel 6". By shifting the control gate or tweel 17, which forms the structural part 17 for the throughput regulation, in the direction of the double arrow depicted next to the reference number 17, it is possible to constrict or to enlarge the cross section of the channel 6', as a result of which the quantity per unit time of the molten glass 8 that is to be hot-formed and exits from the melting tank 2" can be regulated and, in particular, can be adjusted in a defined manner. Furthermore, between the melting tank 2" and the float bath furnace 9', in particular in front of the tweel 17, it is possible to arrange a feeder channel, which in this case, forms the channel 6', in particular also over a longer length than that depicted in FIG. 1. A more detailed description of the throughput regulation is to be found in DE 10 2013 203 624 A1 of the same applicant, which is also made a subject of the present application by reference.

Figure 3:
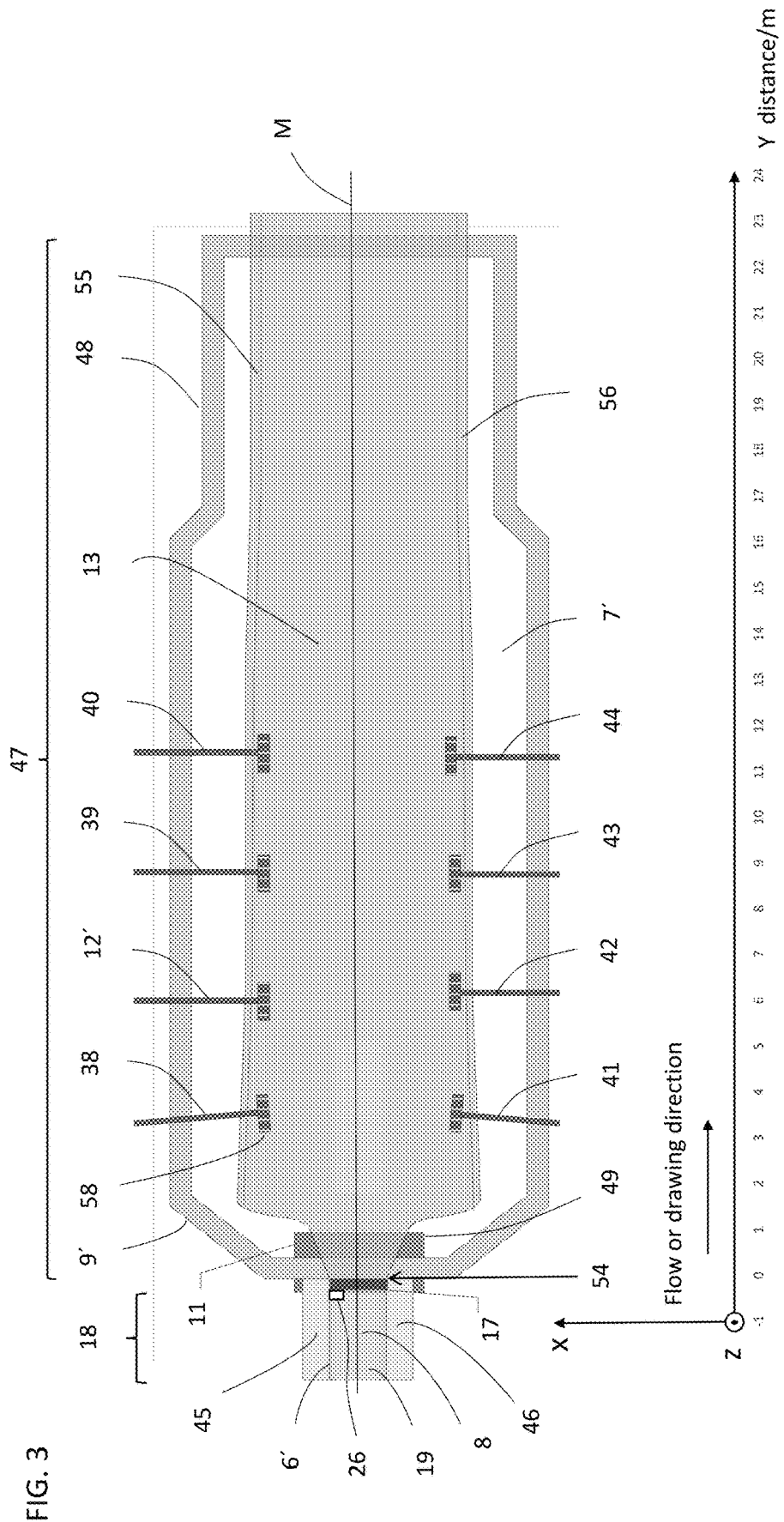
FIG. 3 is a schematic view from the top of a part of a device for the production of a hot-formed glass article of a preferred embodiment, in particular of a glass ribbon that is to be hot-formed on a float bath and is to be formed into a plate-shaped glass article.

Illustrated in FIG. 3 is an arrow 54 at a point in the Y direction in back of the structural part 17 for the throughput regulation or tweel 17 and in front of the lip tile 11 or spout 11. In preferred embodiments, this point in the Y direction lies directly behind the structural part 17 for the throughput regulation or tweel 17 and thus directly behind its back end as viewed in the direction of flow. Insofar as, in the context of this disclosure, statements are made in regard to a position in the Y direction or drawing direction, given lengths refer to the distance to this point depicted by the arrow 54, said lengths also giving the plane in the X direction and Z direction with the Y coordinate=zero.

Seen in the direction of flow of the molten glass 8 that is to be hot-formed, a unit 18 for the defined adjustment of the viscosity of the molten glass 8 that is to be hot-formed is arranged in front of the structural part for the throughput regulation 17 and in front of the lip tile or spout 11.

This unit 18 for the defined adjustment of the viscosity comprises a chamber 19, which is separated from the melting tank 2' or else can form a part it and which takes up the molten glass 8 that is to formed into a plate-shaped glass article in order to adjust its viscosity in a defined manner.

Furthermore, the unit 18 for the defined adjustment of the viscosity comprises regions 20, 21 through which fluid flows, in particular regions through which water flows, whereby said regions absorb heat from the glass 8 that is to be hot-formed and can be designed as a metallic tube system. This metallic tube system can also be colored for better heat absorption or can be furnished with a temperature-stable color on its surface.

Alternatively or additionally, the walls 22, 23, 24, and 25 of the chamber 19 can absorb heat from the glass 8 that is to be hot-formed in that their temperature can be adjusted in a defined manner, for example, by way of additional cooling devices.

The chamber 19 with its walls 22, 23, 24, and 25 can also be designed to be separated spatially from the melting tank 2' and to have metallic walls that are refractory to high temperatures in order to afford an improved dissipation of heat, such as will be described below in detail with reference to FIG. 3.

As described above, the unit 18 for the defined adjustment of the viscosity comprises at least one cooling device, by means of which the temperature and thus also the viscosity of the glass 8 that is to be hot-formed can be adjusted in a defined manner. It is thereby possible in each case to adjust the viscosity of the glass 8 with a maximum deviation of $\Delta \lg \eta/dPas=0.1$ at a point directly in front of the structural part for the throughput regulation or tweel, of $\Delta \lg \eta/dPas=0.2$ for a distance of 1.5 m to the point directly behind the structural part for the throughput regulation or tweel, and of $\Delta \lg \eta/dPas=0.3$ for a distance of 12 m to the point directly behind the structural part for the throughput regulation or tweel.

The unit 18 for the defined adjustment of the viscosity further comprises a sensor unit 26, which records the temperature of the glass 8 that is to be hot-formed, in particular with a maximum deviation of 10° C., and thus also records the viscosity of the glass that is to be hot-formed, in particular with a maximum deviation of $\Delta \lg \eta/dPas=0.1$ at a point directly in front of the structural part for the throughput regulation or tweel, of $\Delta \lg \eta/dPas=0.2$ for a distance of 1.5 m to the point directly behind the structural part for the throughput regulation or tweel, and of $\Delta \lg \eta dPas=0.3/dPas$ for a distance of 12 m to the point directly behind the structural part for the throughput regulation or tweel.

Viscosity measurements are well known to a person skilled in the art in the present technical field.

However, a viscosity measurement or a determination of the viscosity n can also be carried out by a measurement of the temperature T of the respective glass at the given point in each case as well as a corresponding subsequent conversion of the temperature T to viscosity values n.

It is then possible in the case of the respective glass to use its temperature-viscosity curve for a conversion of the temperature values T to viscosity values n. This temperature-viscosity curve can be determined in advance in that, for each temperature T of the respective glass that is to be measured, its viscosity n is measured in a conventional way.

For this purpose, however, it is also possible to use for the respective glass, in particular, the Vogel-Fulcher-Tammann equation $\lg \eta = A + B/(T-T_0)$, which is known to the person skilled in the art, with given values of the temperatures in ° C. in the present case.

For this purpose, the corresponding coefficients $T_0$, A, and B for the respective glass are first determined by experiment and are then used for determining the viscosity n. The value of the measured temperature T then defines the value of the viscosity n that has been correspondingly measured and converted using this equation.

Contact-free as well as, alternatively or additionally, direct temperature measurements in contact with the glass that is to be measured are known to the person skilled in the art. Corresponding sensors are described, for example, with the sensor unit 26 in the context of this disclosure.

The sensor unit 26 can be in direct contact with the glass and hence a direct temperature measurement can be carried out or also can comprise a radiation measuring device, which, through recording of the spectrum emitted from the glass 8 that is to be hot-formed, records the temperature on the basis of the spectrum itself and/or on the basis of the intensity of the emitted radiation. The sensor unit 26 can be arranged at a point directly in front of the tweel 17 and thereby in direct proximity to its front side in the direction of flow or, as can also be seen in FIG. 1 by way of example, also at a short distance from the tweel 17. Instead of only one sensor unit 26, it is also possible to arrange additional sensor units at further points, in particular at further points spaced apart in the direction of the flow, in order to be able to adjust defined cooling gradients and to keep them regulated, for example.

In this way, in the method for the production of a chemically prestressable, hot-formed, plate-shaped glass article, it is possible to obtain an overall cooling gradient Gi of the glass in the shaping region of the float bath, within which the viscosity of the glass that is to be hot-formed is $\lg(\eta/dPas)=4$ to 7.6, of at least 25 K/m to preferably at most 35 K/m and/or also a cooling rate of the glass in this shaping region over time of 28 K/min+/−5 K/min for a thickness D of the hot-formed glass article 13 of 0.4 mm to 3 mm in a defined manner within the deviations described above.

The device 1" for the production of a hot-formed glass article, in particular of a hot-formed, plate-shaped glass article, comprises a unit 47 for hot forming, which is described in detail below also in reference to FIG. 3 and is situated in the flow or drawing direction behind the unit 18 for the defined adjustment of the viscosity and which, via the lip tile or spout 11, takes up the glass 8 that is to be hot-formed.

The lip tile or spout 8 conveys the glass 8 that is to be hot-formed onto a tin bath 7", which is contained in the float bath furnace 9". Referred to as a bay here, in each case, is a float bath section that has a separately controllable heating circuit as well as separately controllable heating units. The first float bath section 1 with the reference sign 32 or bay 1 begins or starts, as viewed in the flow or drawing direction, directly behind the pouring lip 11 for a distance to the structural part for the throughput regulation 17 or control gate 17 of 1.5 m. Each of the float bath sections 1 to 6, which are referred to as the bay 1 to bay 6 with the reference numbers 32 to 37. has its own respective control for the particular electric heaters 10 arranged in it, this being illustrated in the figures merely in a highly schematic manner.

Depending on the embodiment, it is also possible for a far greater number of heaters 10 to be present than are illustrated in the figures, so as to emit the required thermal energy in the drawing direction Y and to be able to adjust the temperature and thus the viscosity of the glass 8 that is to be hot-formed with a maximum deviation of the viscosity of $\Delta \lg \eta/\text{dPas}=0.1$ to $\Delta \lg \eta/\text{dPas}=0.3$ along the drawing direction Y, in particular as will be discussed in more detail at another point of this disclosure.

Figure 7:
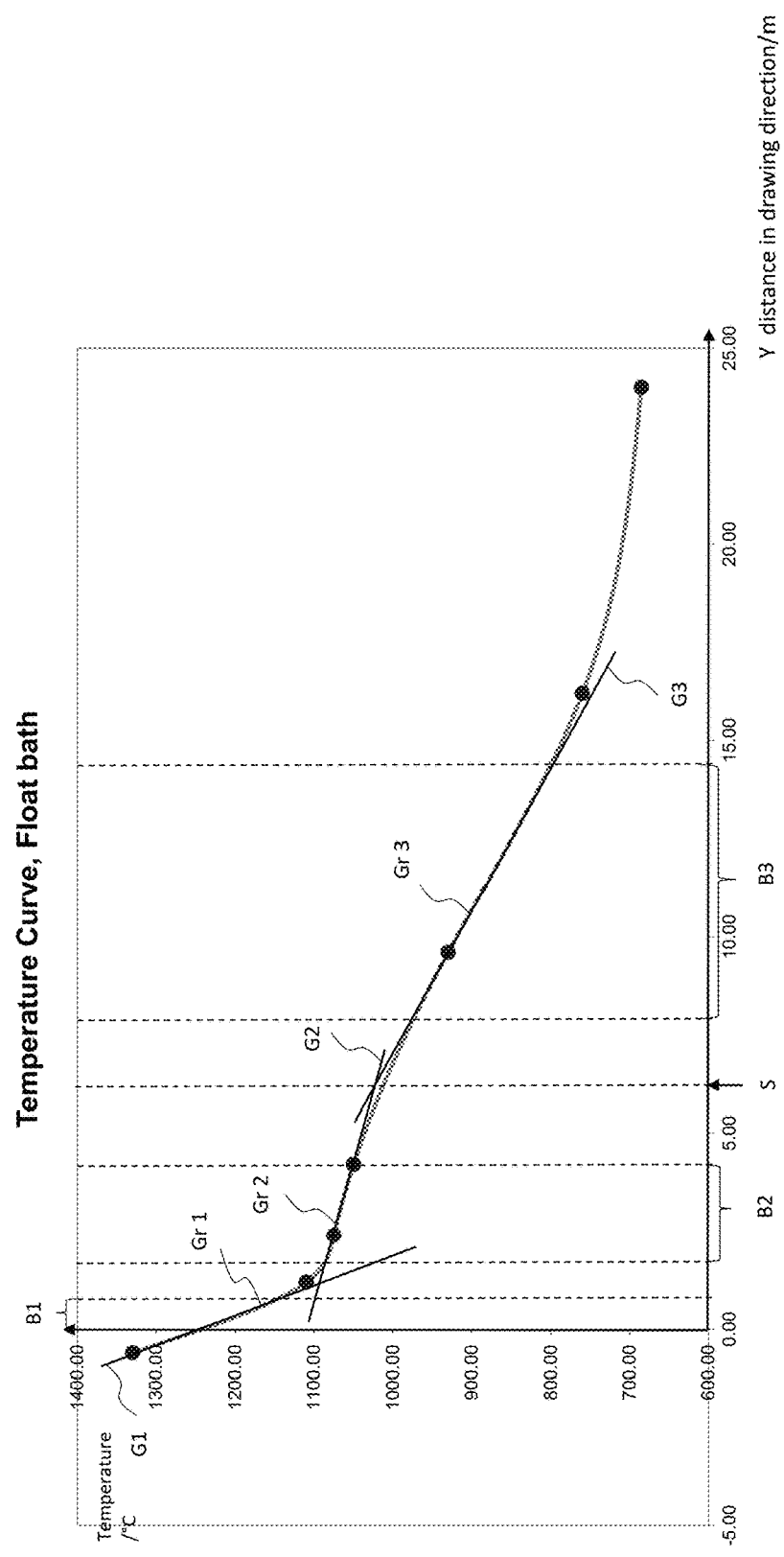
FIG. 7 is a temperature curve of the float bath used for hot-forming, which was measured along the center line M in FIG. 3 and gives the temperature of the surface of the glass that is to be hot-formed.
Figure 8:
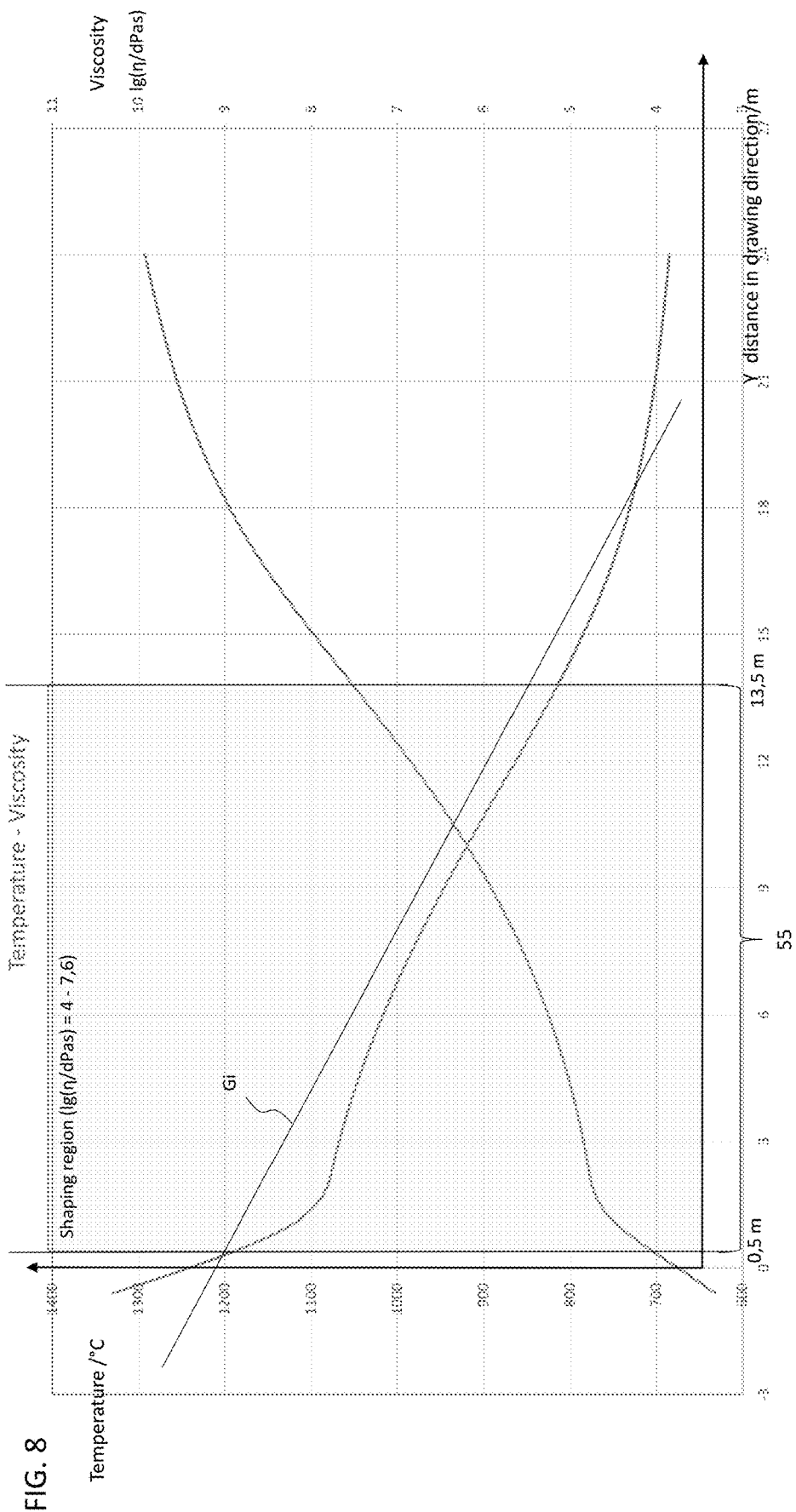
FIG. 8 is a curve of the temperature course of the float bath used for hot forming and a viscosity curve of a presently disclosed, in particular chemically prestressable glass that is to be hot-formed, each of which was measured along the center line M in FIG. 3 and which give the temperature and the viscosity, respectively at the surface of the glass that is to be hot-formed.

In this way, is possible with the requisite exactness also to maintain the temperature course and/or the viscosity course, such as those illustrated, in particular, in FIGS. 7 and 8, during the hot forming of the glass 8 and thus also during the drawing of the glass 8.

The beginning of the float bath section 4 or bay 4 and thus the beginning of the fourth bay or fourth float bath section in the direction of flow lies, by way of example, at a distance of 12 m to the structural part 17 for the throughput regulation or to the control gate. Float baths are, as a rule, subdivided into seven, eight, or more bays, whereas, in FIG. 1 by way of example, only six bays, which lie one behind the other, that is, bay 1 to bay 6 with the reference numbers 32 to 37, are illustrated. For further description, reference is also made to DE 10 2006 051 637 A1, in which float baths with corresponding bays are disclosed.

Arranged above the glass ribbon 13 that forms on the tin bath T are, as can readily be seen in FIG. 3, additional top rollers 38 to 44 in addition to the top roller 12', for the mechanical movement of the glass ribbon 13, from which the plate-shaped, hot-formed glass article 13 is formed in the further course of the solidification of the glass ribbon 13 after its hot forming.

The surface material of the top rollers 38 to 44, which are also referred to as a knurl or knurls, can be made of stainless steel or comprise stainless steel or else have a covering of stainless steel, in particular at its surface 58 that, in each case, is in contact with the glass 8 that is to be hot-formed and that, for the sake of simplicity, is furnished with a reference number in FIG. 3 only for the top roller 38.

The surface of the top rollers 38 to 44 that are in contact with the glass that is to be hot-formed is formed in a structured manner, in particular in a knurled or toothed manner, as indicated in FIG. 3 in each case by light stripes running in the axial direction of the particular top roller 38 to 44.

The surface temperature of the top rollers 38 to 44, in particular the temperature of the surface 58 with which the glass that is to be hot-formed comes into contact, can be adjusted, in each case, for all or individual ones of the top rollers 38 to 44 in such a way thereby, and, in particular, is adjusted in such a way that the seed formation in the lateral border region 55, 56, which, by way of example, is illustrated as an edge of the glass ribbon 13 in FIG. 3 and often has a greater thickness than does the glass 8 in its middle, is reduced.

The knurls 38 to 44 are each cooled by water on the inner side, so that, on contact with the glass, the seed formation temperature is not reached in each case.

When the method for the production of a chemically prestressable, hot-formed, plate-shaped glass article is carried out, adhesions at the top rollers or knurls 38 to 44, such as, for example, condensates or glass cakings, are regularly removed.

Beyond this, the entry of seeds by way of condensates of vaporized tin or glass constituents is minimized by carrying out an exchange of atmosphere at a distance of 0 m to 3 m behind the spout or lip tile 11 in the drawing direction Y, in particular in bay 1, that occurs more than 250 times per hour and, in particular, is more than fifty times the nominal volume and thus constitutes a two-hundred-fifty-fold exchange of the operating volume of the atmosphere, in particular above bay 1, and thus at a distance of 0 m to 3 m behind the spout or lip tile 11.

The nominal volume here represents, in each case, the volume corresponding to the geometric dimensions, and the operating volume represents the volume that is enlarged by heating during the operation.

Seen in FIG. 3 is, furthermore, an alternative or additional design of the unit 18 for the defined adjustment of the viscosity. The molten glass 8 is present in a channel 6' that leads from the melting tank 2', which is not illustrated in FIG. 3, to the float bath furnace 9'. The walls 45, 46 of the channel 6' are formed from a highly refractory metal, such as, for example, platinum, which can also be arranged as a metallic layer on a mineral refractory material. By way of the defined adjustment of the temperature of the walls 45, 46, it is possible to draw heat out of the glass 8 and also to adjust its temperature as well as its viscosity in a defined manner. In this embodiment, too, the sensor unit 26 described above can be arranged preferably in the vicinity of the tweel 17.

Described above for the unit 47 used for hot forming was a drawing unit, which comprises a float unit, in particular a float bath furnace 9' with a tin bath 7'.

Figure 4:
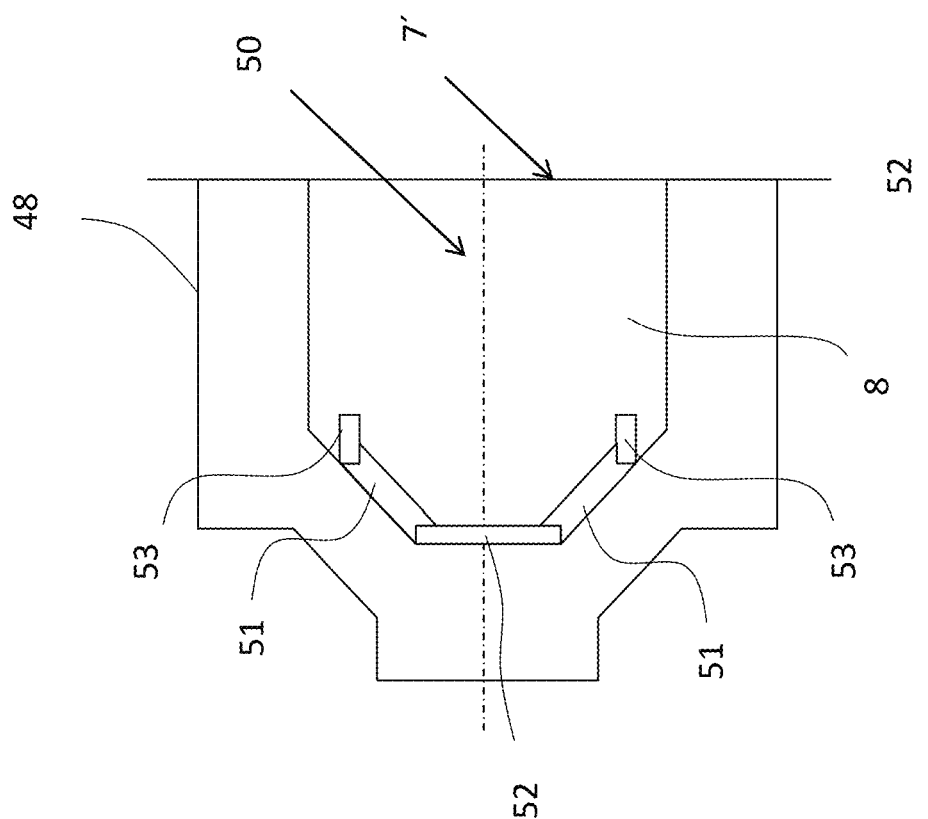
FIG. 4 is a schematic view from the top of a part, also referred to as the backflow region or wetback region, of a device for the production of a hot-formed glass article of a preferred embodiment without extension tiles, in particular of a glass ribbon that is to be hot-formed on a float bath and is to be formed into a plate-shaped glass article.

Reference is made below to FIG. 4, which shows a schematic plan view of part, also referred to as a backflow region or wetback region, of a device 1 for the production of a hot-formed glass article of a preferred embodiment, in particular of a glass ribbon that is to be hot-formed on a float bath and is to be formed into a plate-shaped glass article, but, for the sake of simplicity, without showing the lip tile or spout 11.

Referred to as a wetback or backflow region 50 is here the region of the float bath 7' within which there are speed components in the portions of the molten glass that is to be hot-formed that are opposite to the subsequent drawing direction Y.

Present below the spout or lip tile 11 is a heating unit 49, which is illustrated only schematically in FIG. 3 and by means of which both the lip tile 11 and the molten glass 8 that is to be hot-formed and is present in its proximity can be heated.

This heating unit 49 is preferably arranged in the region of the lip tile or spout 11 so as to adjoin directly the lip tile or spout 11.

Figure 5:
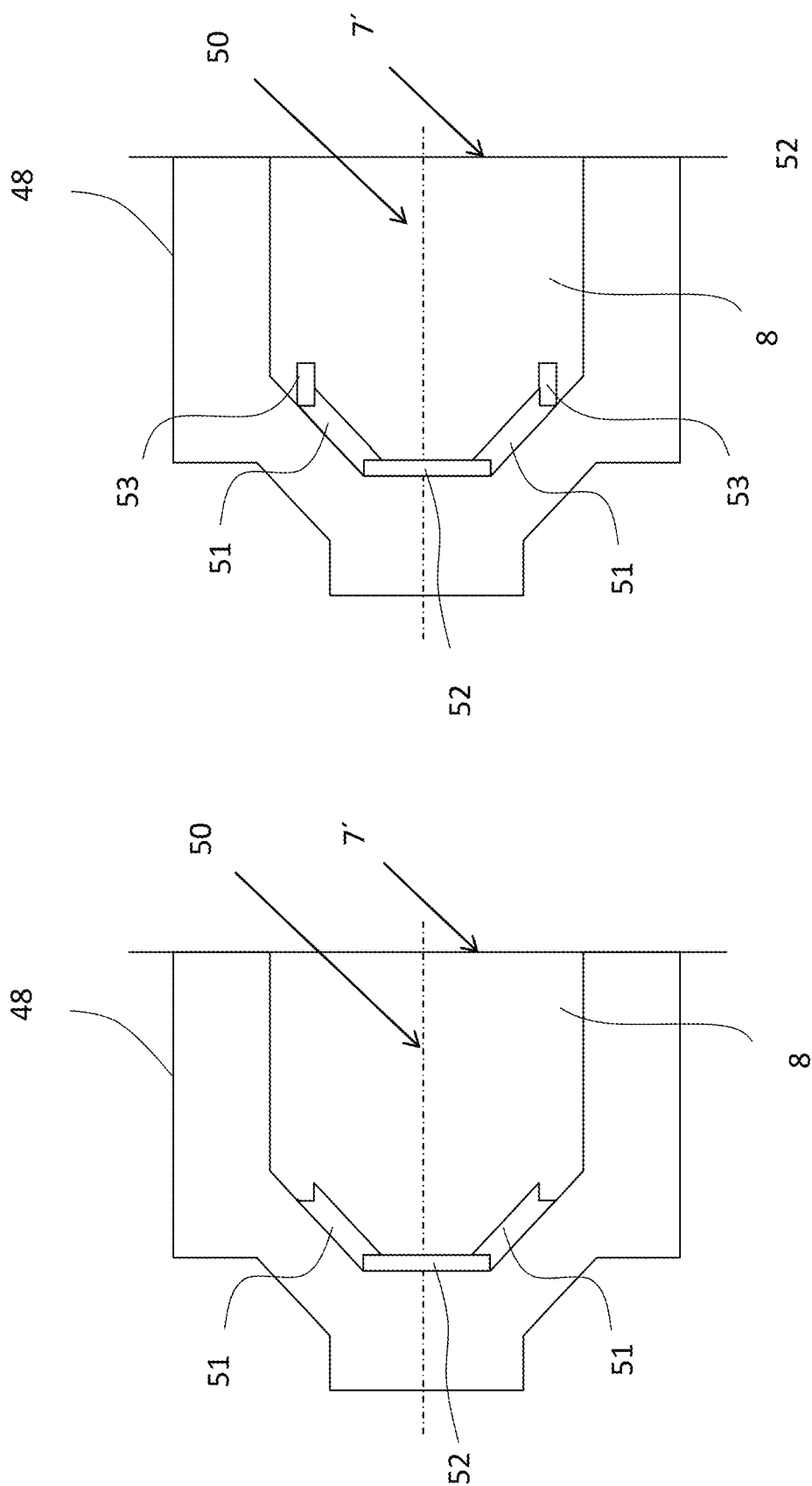
FIG. 5 is a schematic view from the top of a part, also referred to as a backflow region or wetback region, of a device for the production of a hot-formed glass article of a preferred embodiment with extension tiles, in particular of a glass ribbon that is to be hot-formed on a float bath and is to be formed into a plate-shaped glass article.

As illustrated in FIGS. 4 and 5 solely by way of example, the float tank 48 comprises extension tiles 53, which contain graphite or are composed of graphite and which laterally edge a part of the flow of the glass that is to be hot-formed in the float tank 48, at least within the backflow or wetback region 50, in such a way that the molten glass 8 no longer can come into contact with regions of the float tank 48 that contain zirconium oxide.

The extension tiles 53 each lengthen the respective restrictor tiles 51 in the drawing direction Y with the aim of accelerating the glass flow in the edge region of the float bath (shear area).

The extension tiles 53 are "interlocked" with the restrictor tiles 51 in the sense of a form-fitting connection and are prevented from "swimming away" by means of suitable holders, which are known to the person skilled in the art and consequently are not illustrated in the figures, so that they remain arranged in a fixed position during the floating process.

In the method for the production of a chemically prestressable, hot-formed, plate-shaped glass article, it is possible, as a result of the heating of the region of the lip tile or spout 11 by means of the heating unit 49 that is placed beneath the lip tile 11 in the partial flow of the glass 8 that comes into contact with the restrictor tiles 51, to keep the glass temperature above the upper devitrification temperature OEG of the glass 8 that is to be hot-formed.

The viscosity of the glass 8 in the shear region at the restrictor tiles 51 in this case is kept smaller than $\lg(\eta/dPas)=3.5$. The shear region here comprises the entire contact region between the glass and the restrictor tile 51 as well as, in addition, a region that extends out from the restrictor tile 51 in the contact region perpendicular to the surface of the restrictor tile into the glass that is to be hot-formed and has a thickness of about 1 to 5 cm.

Advantageously, the flow rate of the glass 8 at the restrictor tiles is thereby increased by constriction at the end of the float tank 48 by means of the extension tiles 53 in comparison to when the method is carried out without extension tiles.

On account of the temperature and viscosity of the glass, only little entry of crystals or crystallites adhering to the tiles into the glass 8 that is to be hot-formed takes place, in particular at the restrictor tiles as well as preferably at the extension tiles 53, which are composed of graphite.

Shown in FIG. 5 is a schematic view from the top of a part, also referred to as a backflow region or wetback region 50, of a device 1' for the production of a hot-formed glass article of a preferred embodiment, in particular of a glass ribbon that is to be hot-formed on a float bath and is to be formed into a plate-shaped glass article.

Figure 6:
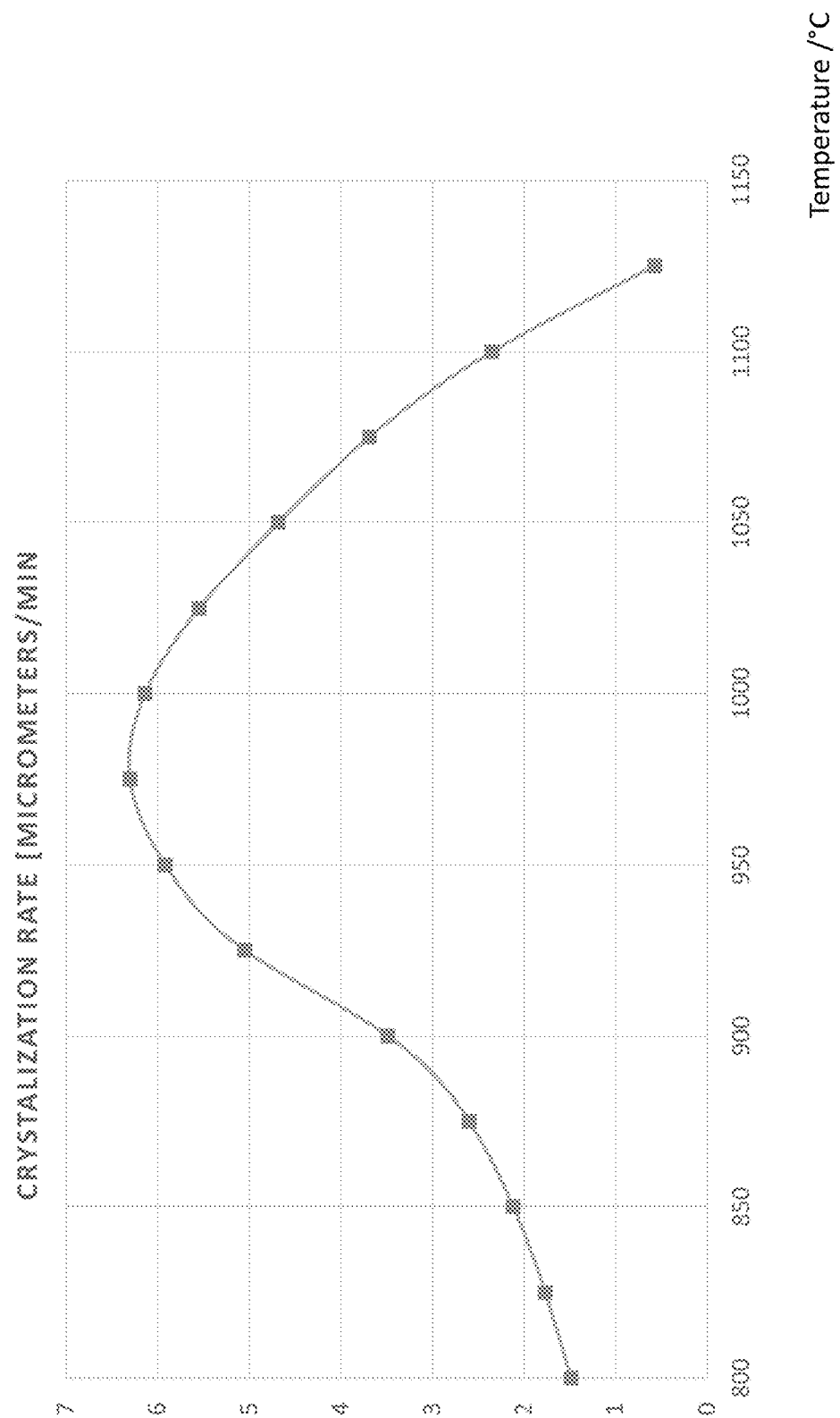

FIG. 6 shows a curve of the rate of crystallization of a preferred glass 8, which will be discussed below in more detail, plotted against its temperature, which is given in ° C.

It can be seen from the illustration of FIG. 6 that the glass 8 for the chemically prestressable, hot-formed, plate-shaped glass article 13 has a temperature range with a maximum crystal growth rate Kgmax (given in ° C.) of 925° C. to 1100° C., preferably 950° C. to 1050° C., and thereby manifests a maximum crystal growth rate Kgmax of 2 µm/min to 16 µm/min, preferably of 4 µm/min to 8 µm/min, in particular of 5.9 µm/min to 6.4 µm/min, in this temperature range.

In general, however, the glass 8 for the chemically prestressable, hot-formed, plate-shaped glass article 13 should have a temperature range with a maximum crystal growth rate Kgmax (given in ° C.) of 925° C. to 1100° C., preferably of 950° C. to 1050° C., and in this case, to manifest a maximum crystal growth rate Kgmax of 2 µm/min to 16 µm/min, preferably of 4 µm/min to 8 µm/min, in particular of 5.9 µm/min to 6.4 µm/min, in this temperature range.

If, in the method for the production of a chemically prestressable, hot-formed, plate-shaped glass article, such as presented above for the device according to the invention, a cooling gradient of the glass in the shaping region of the float bath, within which the viscosity of the glass that is to be hot-formed is $\lg(\eta/dPas)=4$ to 7.6, of at least 25 K/m and preferably at most 35 K/m and/or a cooling rate of the glass in this shaping region of 28 K/min+/−5 K/m for a thickness D of the hot-formed glass article 13 of 0.4 mm to 3 mm is then maintained, it is thereby possible to produce a chemically prestressable, hot-formed, plate-shaped glass article with a composition comprising the components $SiO_2$, $Al_2O_3$, and $Li_2O$ and a content of $ZrO_2$, $SnO_2$, and $TiO_2$ of at least 0.8 wt % as well as preferably at most ten crystals, including crystallites, per kilogram of glass, which have a maximum diameter greater than 1 µm and up to at most 5 µm, preferably up to at most 2 µm.

The content of $ZrO_2$, $SnO_2$, and $TiO_2$ is here in sum total preferably less than 6 wt %, especially preferred less than or equal to 4.5 wt %, and most especially preferred less than or equal to 3 wt %.

A preferred curve of the temperature course in the Y direction along the center line M and in the vicinity of the surface or at the surface of the glass that is to be hot-formed or is hot-formed is illustrated in FIG. 7.

As presently disclosed, the curve of this temperature course can be maintained with the requisite small deviations for the hot-forming process for the glass that is to be hot-formed along the entire shaping region of the float bath 7', within which the viscosity of the glass that is to be hot-formed is $\lg(\eta/dPas)=4$ to 7.6.

It can readily be seen from FIG. 7 that the temperature of the glass 8 that is to be hot-formed along the drawing direction Y comprises at least three sections B1, B2, and B3, within which the temperature of the glass that is to be hot-formed changes essentially linearly with the point Y along the drawing path.

Along these three sections B1, B2, B3, therefore, a respective gradient G1, G2, and G3 of the temperature course is formed by way of the corresponding adjustment of the temperature of the glass 8 that is to be hot-formed and this defines a spatial or point-related cooling rate of the glass as a function of the point Y in the drawing direction.

Within the first region B1, the molten glass that comes from the lip tile 11 and is to be hot-formed impinges on the float bath 7'. Within this region B1, the glass 8 is cooled at a very high point-related cooling rate in a defined manner. In this way, it is possible for the glass 8, as will be described in more detail in the context of the present disclosure, to flow through the wetback region 50 with only a very small entry of heterogeneous seed formers, that is, with a very small input of seed formers from outside of the glass.

In the adjoining area B2 with a very short transition region, a substantial part of the shaping takes place with the gradient G2.

In order to minimize any further seed formation, the region B3 with the gradient G3 adjoins the region B2.

The inventors have found that the position of the point of intersection S in the drawing direction Y of the two straight lines Gr 2 and Gr 3, which are defined by the gradients G2 and G3, as shown in FIG. 7 by way of example, represents an advantageous value for the presently disclosed hot-forming method.

The straight line Gr 2 here represents the extension of the nearly linear temperature course within the region B2 that goes beyond the temperature course in the Y direction, and the straight line Gr 3 represents the extension of the nearly linear temperature course within the region B3 that goes beyond the temperature course in the negative Y direction. Gr 1 represents the straight line as an extension of the nearly linear temperature course within the region B1. The straight lines Gr 1 to Gr 3 were each approximated in a region B1 to B3 within which the respective gradients G1 to G3, in each case along a distance in the Y direction of at least 0.25 m, but also longer, does not deviate by more than +/−5%, preferably by not more than +/−3%, from the first derivative in the drawing direction Y of the temperature curve of the float bath illustrated in FIG. 7 solely by way of example.

In a surprising way, it has been found that, depending on the thickness D to which the glass article that is to be hot-formed is formed, advantageous values for the point of intersection S are obtained and, in particular, can contribute to the sought-after small number of crystals, including crystallites, in the hot-formed glass article 13.

These values are listed in the following two tables.

TABLE 1

Minimum values of the distance of the point of intersection S in the Y direction

| Thickness of the glass article 13/mm | Minimum distance of the point of intersection S in the Y direction/m |
|---|---|
| 0.4 | 6.50 |
| 0.5 | 6.40 |
| 0.6 | 6.32 |
| 0.7 | 6.25 |
| 0.8 | 6.20 |
| 0.9 | 6.15 |
| 1 | 6.10 |
| 1.1 | 6.06 |
| 1.5 | 5.93 |
| 1.75 | 5.87 |
| 2 | 5.81 |
| 2.25 | 5.76 |
| 2.5 | 5.72 |
| 2.75 | 5.68 |
| 3 | 5.65 |
| 4 | 5.54 |

TABLE 2

Maximum values of the distance of the point of intersection S in the Y direction

| Thickness of the glass article 13/mm | Maximum distance of the point of intersection S in the Y direction/m |
|---|---|
| 0.4 | 7.36 |
| 0.5 | 7.24 |
| 0.6 | 7.15 |
| 0.7 | 7.07 |
| 0.8 | 7.01 |
| 0.9 | 6.95 |
| 1 | 6.90 |
| 1.1 | 6.85 |
| 1.5 | 6.71 |
| 1.75 | 6.63 |
| 2 | 6.57 |
| 2.25 | 6.52 |
| 2.5 | 6.47 |
| 2.75 | 6.43 |
| 3 | 6.39 |
| 4 | 6.26 |

The expression "distance of the point of intersection S in the Y direction" describes here, in each case, the distance of the point of intersection S in the Y direction to a point directly behind the structural part for throughput regulation and thus the control gate 17 and is given each time for the middle of the glass ribbon 13 along the center line M.

Figure 9:
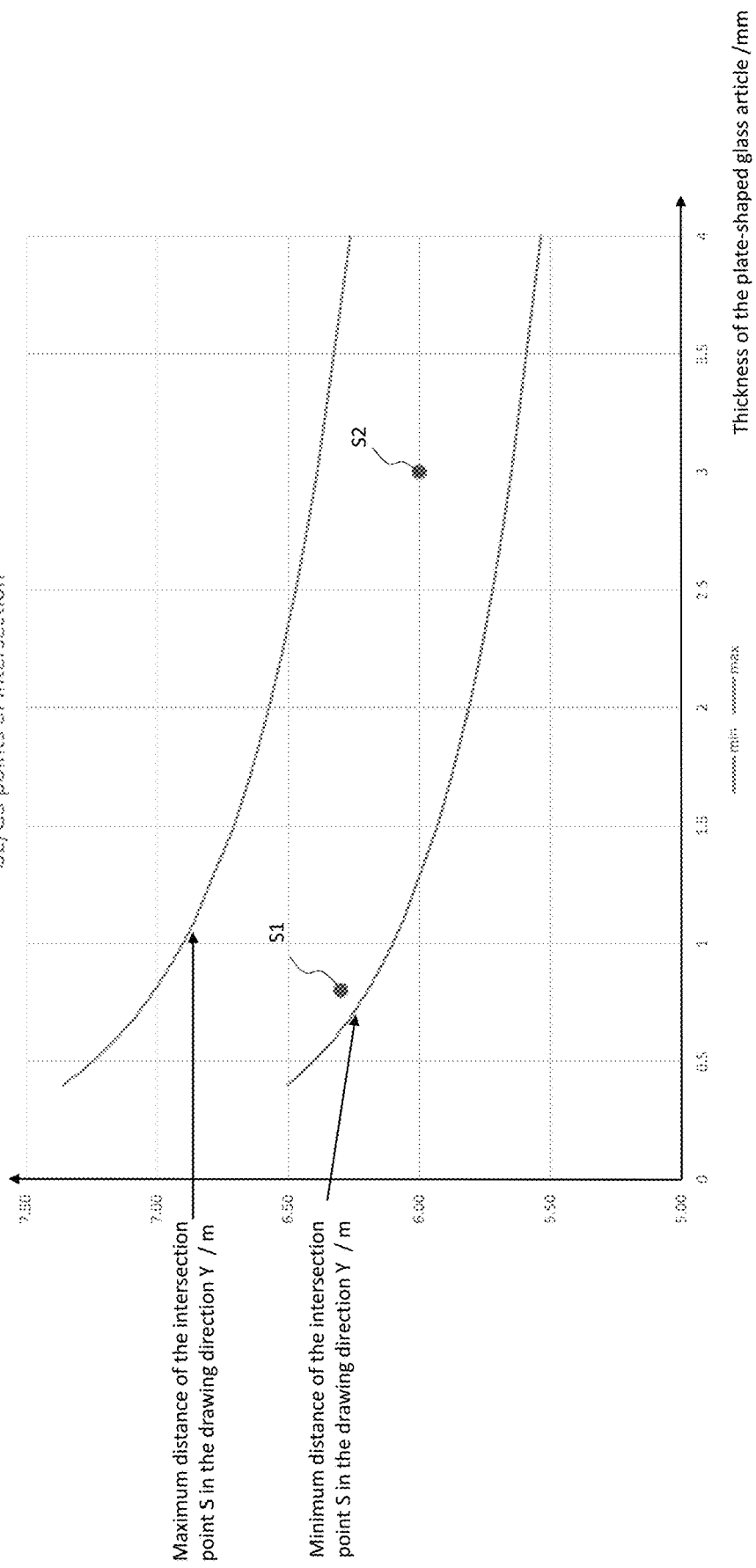
FIG. 9 show curves for the maximum distance as well as the minimum distance of the point of intersection of two straight lines Gr 2 and Gr 3, which are determined on the basis of the gradients G2 and G3 of the curve of the temperature course along the drawing direction Y of the glass that is to be hot-formed as a function of the thickness with which the hot-formed, plate-shaped glass article exits the float bath furnace.

These relationships are depicted even more clearly in FIG. 9, which shows the curves for the maximum distance as well as the minimum distance of the point of intersection S of the straight lines Gr 2 and Gr 3 as a function of the thickness D with which the hot-formed, plate-shaped glass article 13 exits the float bath furnace.

By way of example, in FIG. 9, the preferred positions of the point of intersection S as a point of intersection S1 for a roughly 0.7-mm-thick hot-formed glass article 13 and as a point of intersection S2 for a roughly 3-mm-thick hot-formed glass article 13 can be seen.

The following Table 3 shows exemplary values of the gradients G1, G2, and G3 for various exemplary thicknesses D of the plate-shaped glass article 13 that is to be hot-formed as well as the position and thus the distance in the drawing direction Y to a point directly behind the control gate of the point of intersection S of the straight lines Gr 2 and Gr 3.

TABLE 3

| Thickness D in mm | Gradient G1 in K/m | Gradient G2 in K/m | Gradient G3 in K/m | Position of the point of intersection Gr 2/Gr 3 in m |
|---|---|---|---|---|
| 0.8 | 187 | 12 | 27 | 6.3 |
| 3 | 164 | 5 | 29 | 6 |

Figure 2:
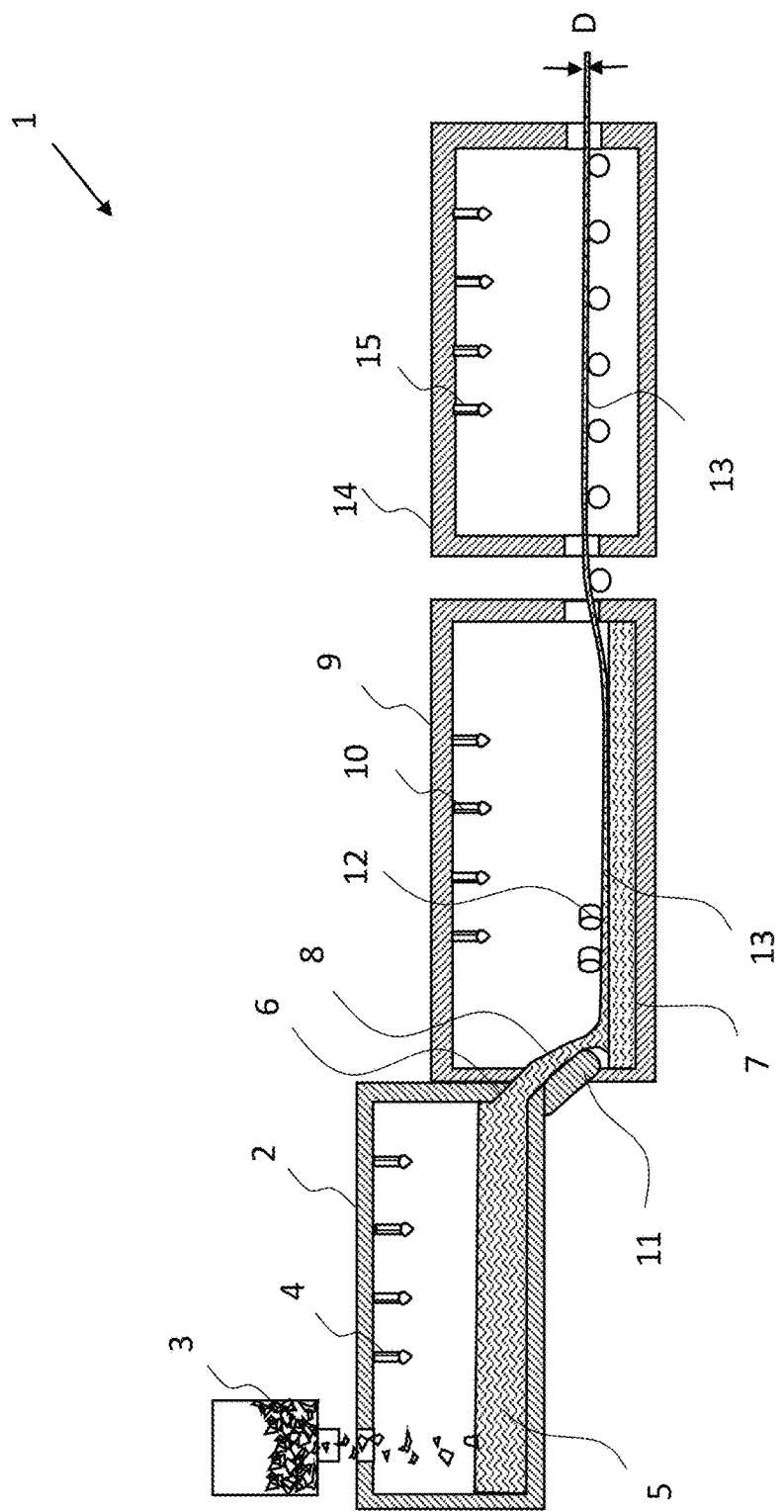
FIG. 2 is a schematic sectional view of a device for the production of a hot-formed glass article of a conventional float facility, in which the sectional plane extends vertically roughly through the middle of the device.

FIG. 8 shows a temperature curve of the float bath T used for hot forming and a viscosity curve of a glass article produced in it, each of which was measured along the center lines M in FIG. 2 and which give the temperature and the viscosity at the surface of the glass that is to be hot-formed.

Also readily seen in FIG. 8 is the shaping region 55, which extends in the Y direction from roughly 0.5 m to roughly 13.5 m.

In this shaping region 55, within which the viscosity of the glass that is to be hot-formed is $\lg(\eta/dPas)=4$ to 7.6, an overall cooling gradient Gi of the glass 8 of at least 25 K/m to preferably at most 35 K/m is adjusted.

Here, the cooling rate of the glass 8 over time in this shaping region 55 is preferably roughly 28 K/min+/−5 K/min for a thickness D of the hot-formed glass article 13 of 0.4 mm to 3 mm.

Preferably used for the chemically prestressable, plate-shaped glass article 13 is a glass 8 with a composition comprising the components $SiO_2$, $Al_2O_3$, and $Li_2O$, preferably with a composition comprising the following components in wt %: $SiO_2$ 57 to 69, preferably 59 to 69, especially preferred 61 to 69, where the upper limit in each case can be preferably 67, $Al_2O_3$ 17 to 25, preferably 17 to 24, especially preferred 17 to 21, $B_2O_3$ 0 to 7, preferably 0 to 5, especially preferred 0 to 4.5, $Li_2O$ 3 to 5.5, preferably 3.5 to 5.5, especially preferred 3.5 to 5, $Na_2O$ 0.3 to 7, preferably 0.3 to 6, especially preferred 0.8 to 5.5, or even most preferred from 0.8 to 4.5, where preferably the sum of the content of $Al_2O_3$ and $SiO_2$, in relation to the given value in wt %, lies between at least 75 and at most 92, preferably at most 90.

In the presently disclosed embodiments, the lower limit of the $Na_2O$ can also lie, in general, at 0.3 wt %.

In a further embodiment, the glass 8 comprises the following components in wt %: $SiO_2$ 57 to 69, preferably 59 to 69, especially preferred 61 to 69, where the upper limit in each case can be preferably 67, $Al_2O_3$ 17 to 25, preferably 17 to 24, especially preferred 17 to 21, $B_2O_3$ 0 to 7, preferably 0 to 5, especially preferred 0 to 4.5, $Li_2O$ 3 to 5.5, preferably 3.5 to 5.5, especially preferred 3.5 to 5, $Na_2O$ 0.3 to 7, preferably 0.3 to 6, especially preferred 0.8 to 5.5, even more preferred 0.8 to 4.5, $K_2O$ 0 to 1, preferably 0 to 0.8, especially preferred 0 to 0.7, MgO 0 to 2, preferably 0 to 1.5, especially preferred 0 to 1, CaO 0 to 4.5, SrO 0 to 2, preferably 0 to 1.5, especially preferred 0 to 1, ZnO 0 to 3, preferably 0 to 2, especially preferred 0 to 1.5, $P_2O_5$ 0 to 3, preferably 0 to 2, especially preferred 0 to 1.7, $ZrO_2$ 0 to 3, preferably 0 to 2.8, especially preferred 0-2.5, most especially preferred 0-1, $TiO_2$ 0 to 3, preferably 0 to 2.8, especially preferred 0-2.5, most especially preferred 0-1, $SnO_2$ 0 to 2, preferably 0 to 1.5, especially preferred 0-1, most especially preferred 0-0.8, where, furthermore, contaminants and/or refining agents and/or coloring constituents in amounts up to 2 wt % can be contained and where the previously mentioned $SnO_2$ is a refining agent in the sense of the refining agent additionally present.

By way of hot forming, the glass article 13 could assume a thickness that, for example, amounted to at least 0.4 mm and at most 3 mm.

In preferred embodiments, the thickness of the glass article 13 was at least 0.5 mm and at most 2 mm. In further preferred embodiments, the thickness was even only at most 1 mm.

In the method described above for the hot forming, the obtained quantity of the glass 8 of the hot-formed, plate-shaped glass article 13 was preferably up to 50 tons per day.

LIST OF REFERENCE CHARACTERS 1 facility for the production of floated glass, float facility
1' device according to the invention for the production of a hot-formed, plate-shaped glass article, float facility
2 melting tank or melting furnace
2' melting tank or melting furnace
3 glass batch
4 burner
5 glass melt
6 channel of the melting tank
6' channel of the melting tank
7 float bath, in particular tin bath
7' float bath, in particular tin bath
8 molten glass that is to be hot-formed
9 float bath furnace
9' float bath furnace
10 electric heater
11 pouring lip, lip tile, or spout
12 top roller
12' top roller
13 glass ribbon or hot-formed, plate-shaped glass article after solidification of the glass 8
14 lehr or cooling furnace
15 electric heater
16 device for melting
17 structural part for the throughput regulation, control gate, tweel
18 device for the defined adjustment of the viscosity
19 chamber
20 region through which fluid flows
21 region through which fluid flows
22 wall of the chamber 19
23 wall of the chamber 19
24 wall of the chamber 19
25 wall of the chamber 19
26 sensor unit
27
28
29
30
31
32 bay or float bath section 1
33 bay or float bath section 2
34 bay or float bath section 3
35 bay or float bath section 4
36 bay or float bath section 5
37 bay or float bath section 6
38 top roller
39 top roller
40 top roller
41 top roller
42 top roller
43 top roller
44 top roller
45 wall of the channel 6'
46 wall of the channel 6'
47 unit for hot forming
48 float tank
49 heating unit, in particular underlip heating unit
50 wetback or backflow region
51 restrictor tile edge tile of the float tank, in particular of the float bath in the wetback or backflow region
52 wetback tile
53 extension tile, extension edge tile
54 arrow for indicating the point in the drawing direction with a Y coordinate=zero
55 shaping region
56 lateral border region
57 lateral border region
58 surface 58 of the top roller 38 that is in contact with the glass 8 that is to be hot-formed
59 vent-out or exhaust fluid pumps, depicted for bay 1
M center line of the glass or glass ribbon in the X direction
D thickness of the plate-shaped glass article
B1 section within which the temperature of the glass that is to be hot-formed changes linearly with the point Y along the drawing path
B2 section within which the temperature of the glass that is to be hot-formed changes linearly with the point Y along the drawing path
B3 section within which the temperature of the glass that is to be hot-formed changes linearly with the point Y along the drawing path
G1 gradient of the temperature course, which defines a cooling rate of the glass 8 as a function of the point Y in the drawing direction
G2 gradient of the temperature course, which defines a cooling rate of the glass 8 as a function of the point Y in the drawing direction G3 gradient of the temperature course, which defines a cooling rate of the glass 8 as a function of the point Y in the drawing direction Gr 1 straight line as an extension of the linear temperature course within the B1 region Gr 2 straight line as an extension of the linear temperature course within the B2 region, going beyond it in the Y direction Gr 3 straight line as an extension of the linear temperature course within the B3 region, going beyond it in the negative Y direction S point of intersection of the straight lines Gr 2 and Gr 3

S1 preferred point of intersection of the straight lines Gr 2 and Gr 3 for a roughly 0.7-mm-thick hot-formed glass article 13

S2 preferred point of intersection of the straight lines Gr 2 and Gr 3 for a roughly 3-mm-thick hot-formed glass article 13

Gi overall cooling gradient within the shaping region 55 within which the viscosity of the glass that is to be hot-formed is $\lg(\eta/dPas)=4$ to 7.6

What is claimed is:

1. A chemically prestressable, hot-formed, plate-shaped glass article, the glass article comprising:
    a composition comprising $SiO_2$, $Al_2O_3$, and $Li_2O$;
    a content of $ZrO_2$, $SnO_2$, and $TiO_2$ that totals at least 0.8 wt %; and
    at most ten crystals or crystallites per kilogram of glass that have a maximum diameter greater than 1 μm and less than or equal to 5 μm.

2. The glass article of claim 1, wherein the maximum diameter is up to at most 2 μm.

3. The glass article of claim 1, wherein the glass article comprises a maximum crystal growth rate Kgmax of 2 μm/min to 16 μm/min in a temperature range of 925° C. to 1100° C.

4. The glass article of claim 3, wherein the maximum crystal growth rate is 5.9 μm/min to 6.4 μm/min.

5. The glass article of claim 1, wherein the composition comprises, in wt %:
    $SiO_2$ 57 to 69,
    $Al_2O_3$ 17 to 25,
    $B_2O_3$ 0 to 7,
    $Li_2O$ 3 to 5.5,
    $Na_2O$ 0.3 to 7, and
    a sum of a content of $Al_2O_3$ and $SiO_2$ between at least 75 and at most 92.

6. The glass article of claim 5, wherein the composition comprises:
    $SiO_2$ 61 to 67,
    $Al_2O_3$ 17 to 21,
    $B_2O_3$ 0 to 4.5,
    $Li_2O$ 3.5 to 5,
    $Na_2O$ 0.8 to 4.5,
    $K_2O$ 0 to 1,
    $MgO$ 0 to 2,
    $CaO$ 0 to 4.5,
    $SrO$ 0 to 2,
    $ZnO$ 0 to 3
    $P_2O_5$ 0 to 3
    $ZrO_2$ 0 to 3,
    $TiO_2$ 0 to 3, and
    $SnO_2$ 0 to 2.

7. The glass article of claim 6, wherein the composition further comprises contaminants and/or refining agents and/or coloring constituents in amounts up to 2 wt %.

8. The glass article of claim 1, further comprising a thickness that is at least 0.5 mm and at most 1 mm.

9. The glass article of claim 1, further comprising a thickness that is at least 0.5 mm.

10. The glass article of claim 1, further comprising a thickness that is at most 1 mm.

11. The glass article of claim 1, further comprising a thickness that is at most 0.4 mm.

12. The glass article of claim 1, wherein the composition comprises 0.3 to 7 wt % $Na_2O$.

13. The glass article of claim 1, wherein the glass article does not have any crystals or crystallites with a maximum diameter that is greater than 5 μm.

14. A cover panel for a mobile data processing device, the cover panel comprising:
    the glass article of claim 1,
    wherein the mobile data processing device is at least one selected from the group consisting of: a mobile phone, a mobile computer, a palm top, a laptop computer, a tablet computer, a wearable, and a watch.

15. A chemically prestressable, plate-shaped glass article produced or producible in a down-draw or overflow fusion method, the glass article comprising:
    a composition comprising $SiO_2$, $Al_2O_3$, and $Li_2O$;
    a content of $ZrO_2$, $SnO_2$, and $TiO_2$ that totals at least 0.8 wt %; and
    at most ten crystals or crystallites per kilogram of glass that have a maximum diameter greater than 1 μm and less than or equal to 5 μm.

16. The glass article of claim 15, wherein the maximum diameter is up to at most 2 μm.

17. The glass article of claim 15, further comprising a thickness that is at most 1 mm.

18. The glass article of claim 15, wherein the composition comprises, in wt %:
    $SiO_2$ 57 to 69,
    $Al_2O_3$ 17 to 25,
    $B_2O_3$ 0 to 7,
    $Li_2O$ 3 to 5.5,
    $Na_2O$ 0.3 to 7, and
    a sum of a content of $Al_2O_3$ and $SiO_2$ between at least 75 and at most 92.

19. The glass article of claim 18, wherein the composition comprises:
    $SiO_2$ 61 to 67,
    $Al_2O_3$ 17 to 21,
    $B_2O_3$ 0 to 4.5,
    $Li_2O$ 3.5 to 5,
    $Na_2O$ 0.8 to 4.5,
    $K_2O$ 0 to 1,
    $MgO$ 0 to 2,
    $CaO$ 0 to 4.5,
    $SrO$ 0 to 2,
    $ZnO$ 0 to 3
    $P_2O_5$ 0 to 3
    $ZrO_2$ 0 to 3,
    $TiO_2$ 0 to 3, and
    $SnO_2$ 0 to 2.

20. The glass article of claim 15, wherein the glass article does not have any crystals or crystallites with a maximum diameter that is greater than 5 μm.

\* \* \* \* \*